Jan. 15, 1924.  
A. G. LIEBMANN  
1,480,623

AUTOMATIC FLUID PRESSURE OPERATED MACHINE SHOVEL

Filed July 7, 1919   16 Sheets-Sheet 1

Inventor.  
A. G. Liebmann.  
By Lacey & Lacey,  
Attorneys.

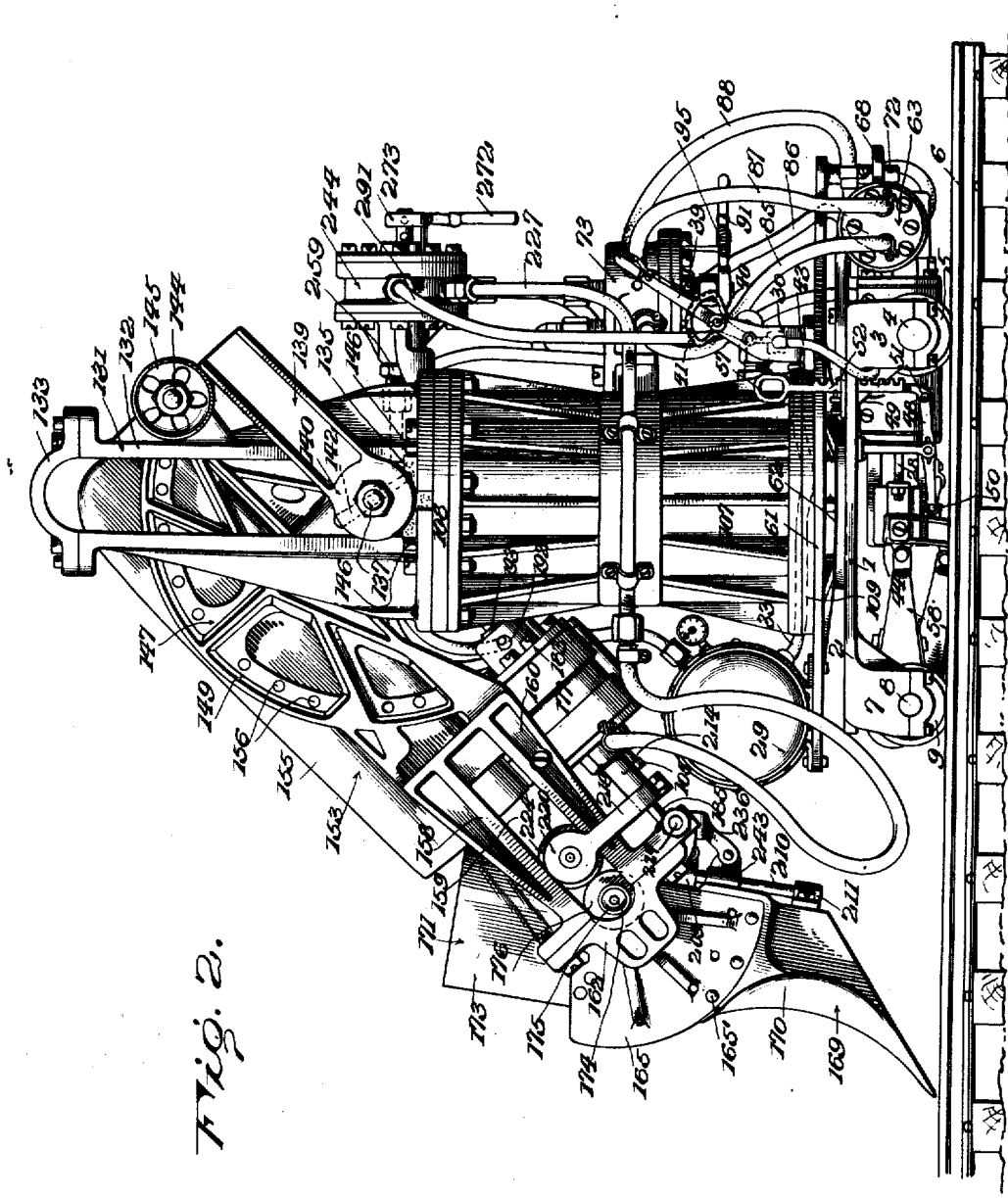

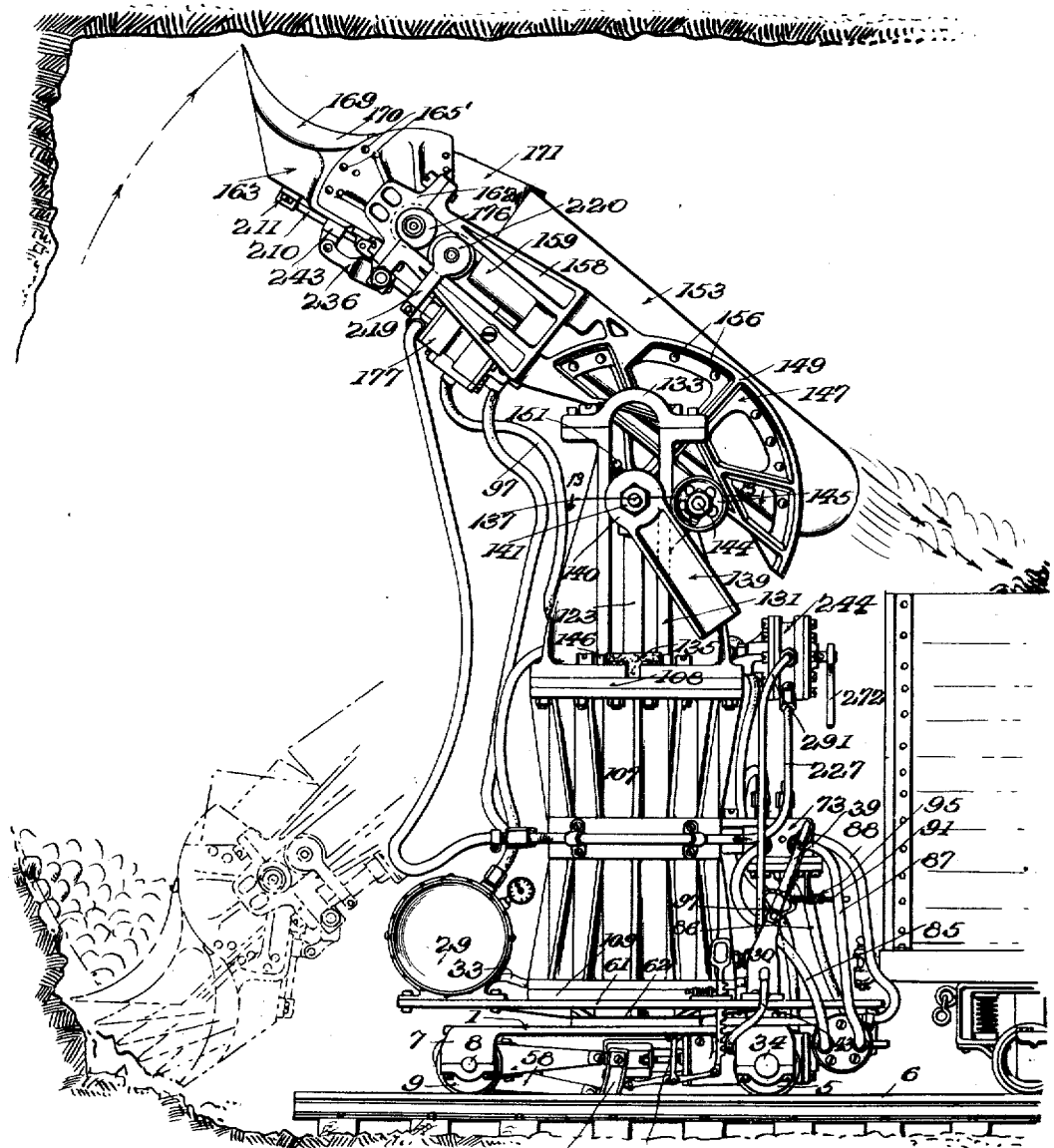

Jan. 15, 1924. 1,480,623
A. G. LIEBMANN
AUTOMATIC FLUID PRESSURE OPERATED MACHINE SHOVEL
Filed July 7, 1919 16 Sheets-Sheet 4
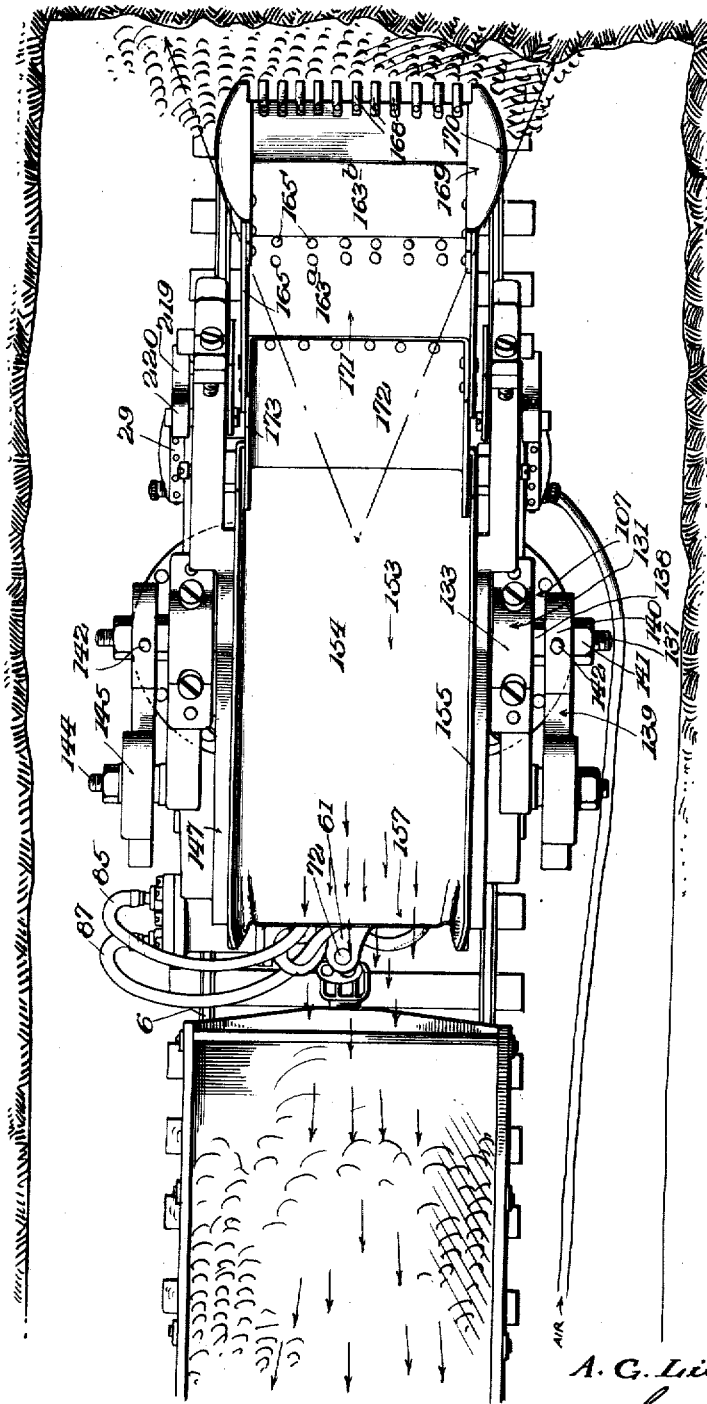
Inventor
A. G. Liebmann
by Lacey & Lacey
Attorneys.

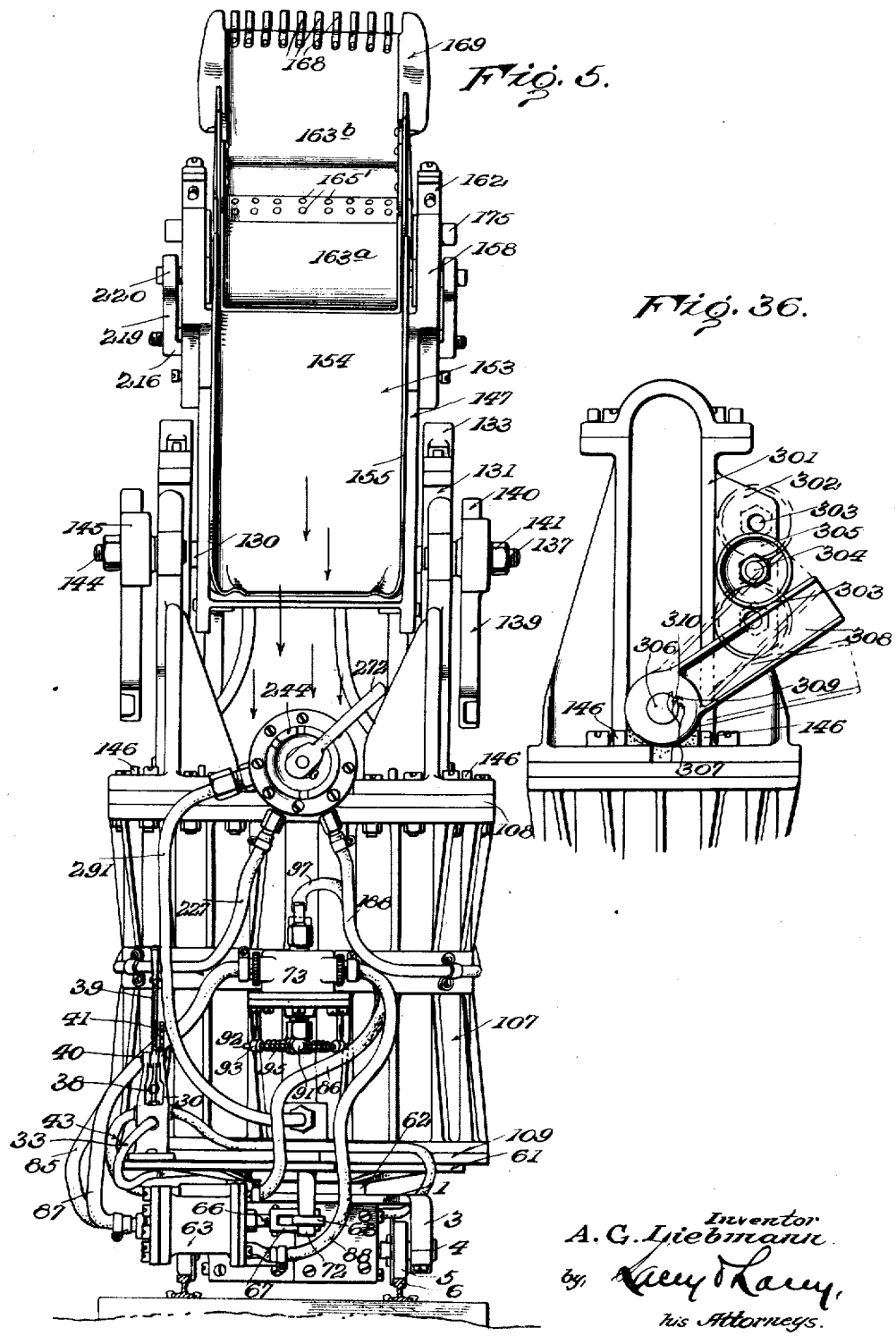

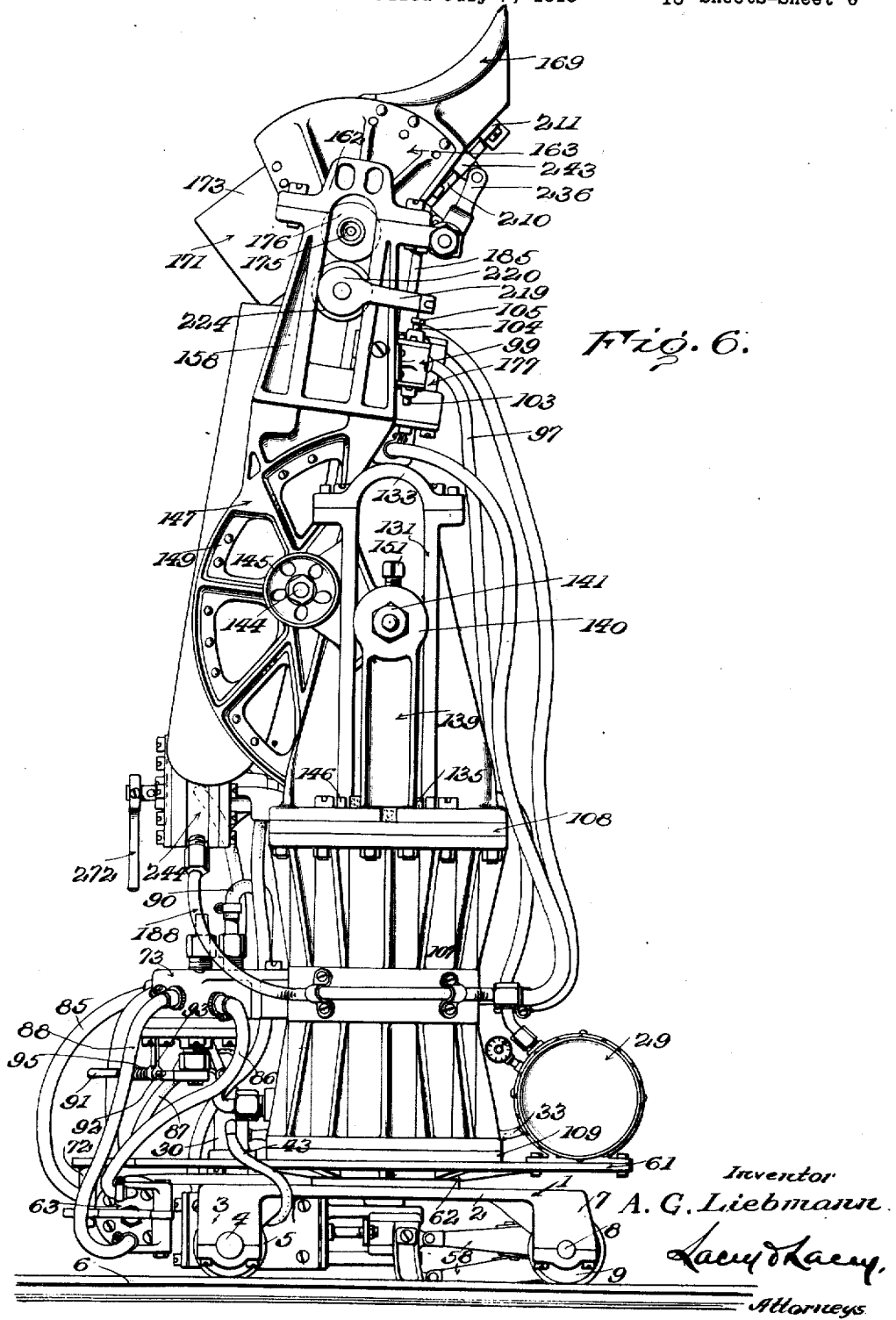

Jan. 15, 1924. 1,480,623
A. G. LIEBMANN
AUTOMATIC FLUID PRESSURE OPERATED MACHINE SHOVEL
Filed July 7, 1919 16 Sheets-Sheet 7
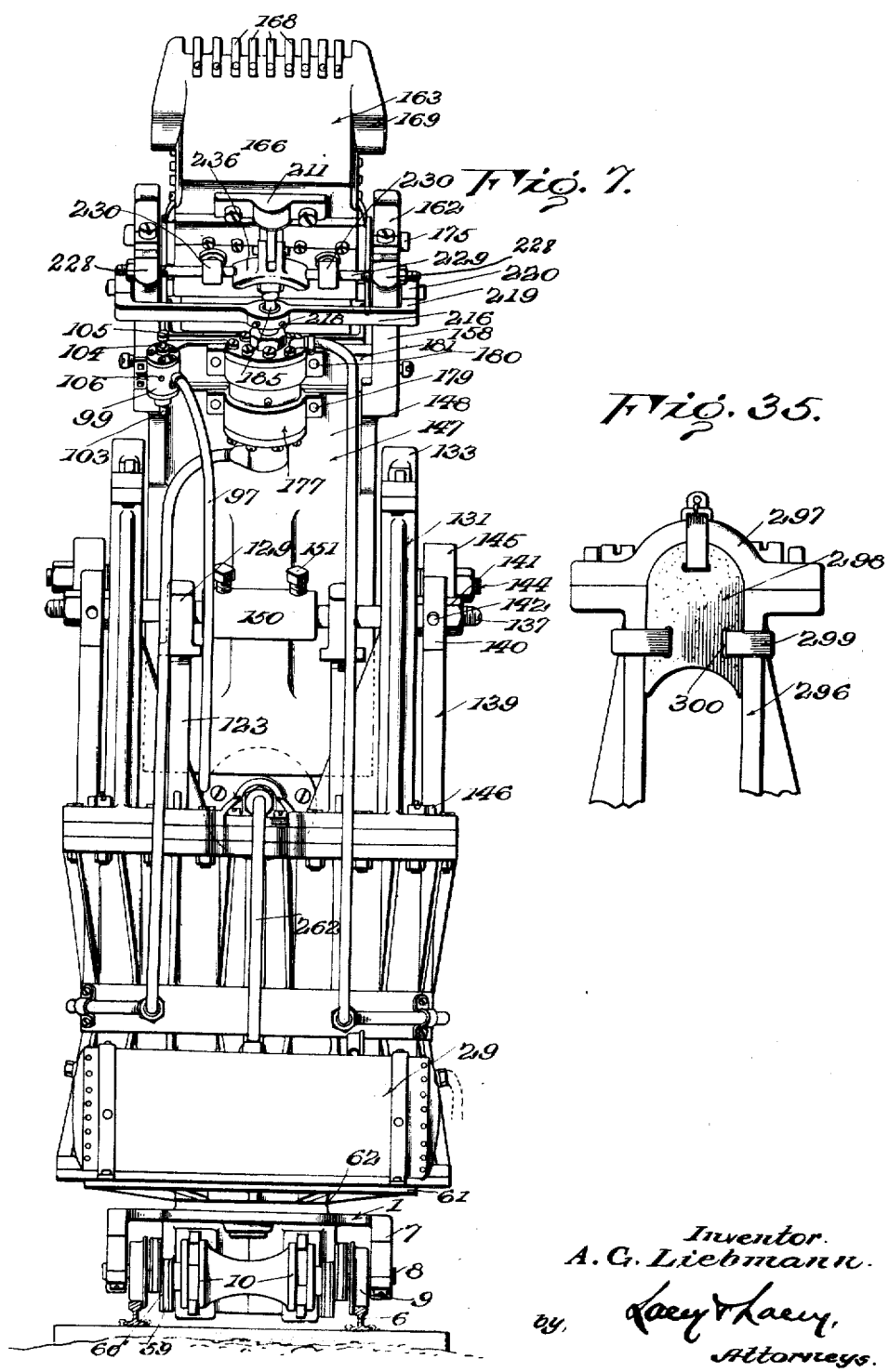

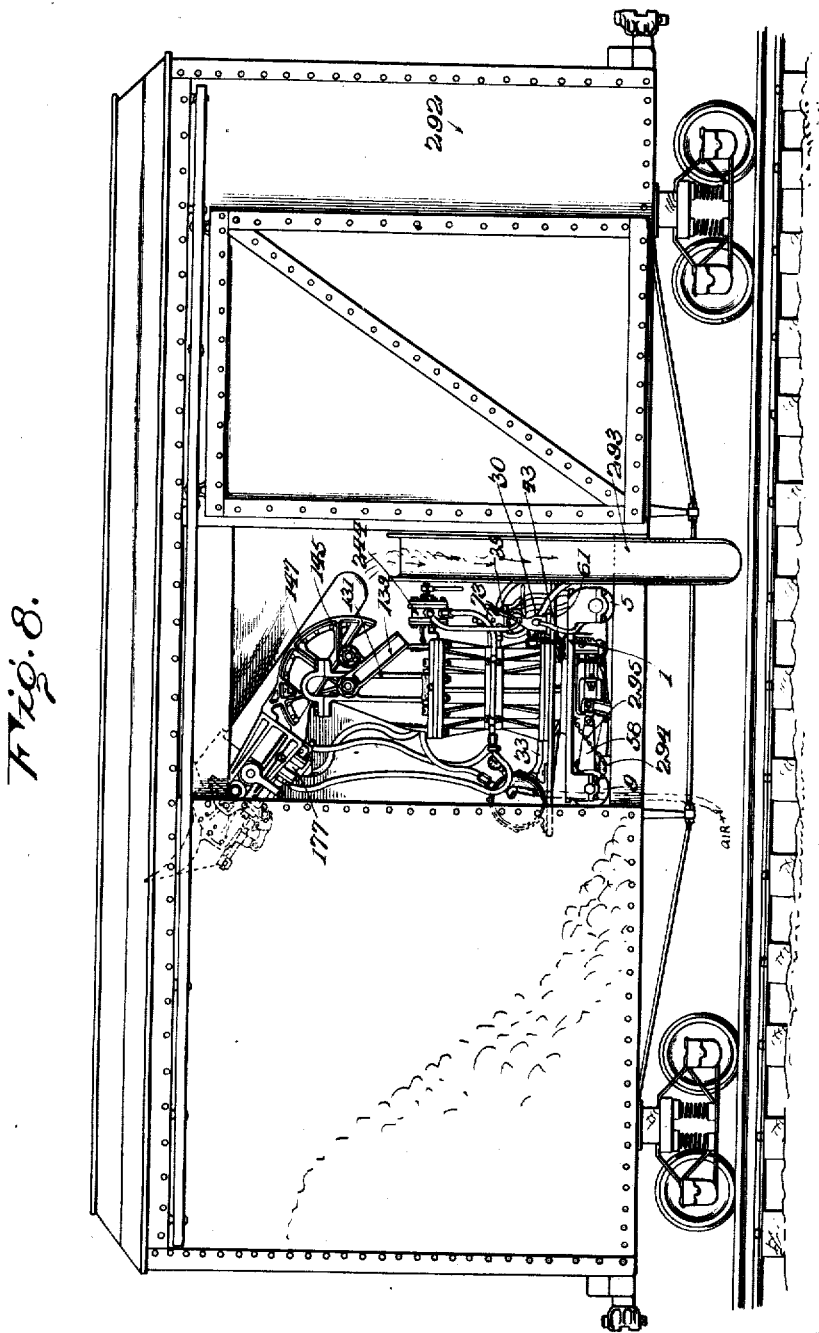

Jan. 15, 1924. 1,480,623
A. G. LIEBMANN
AUTOMATIC FLUID PRESSURE OPERATED MACHINE SHOVEL
Filed July 7, 1919 16 Sheets-Sheet 9
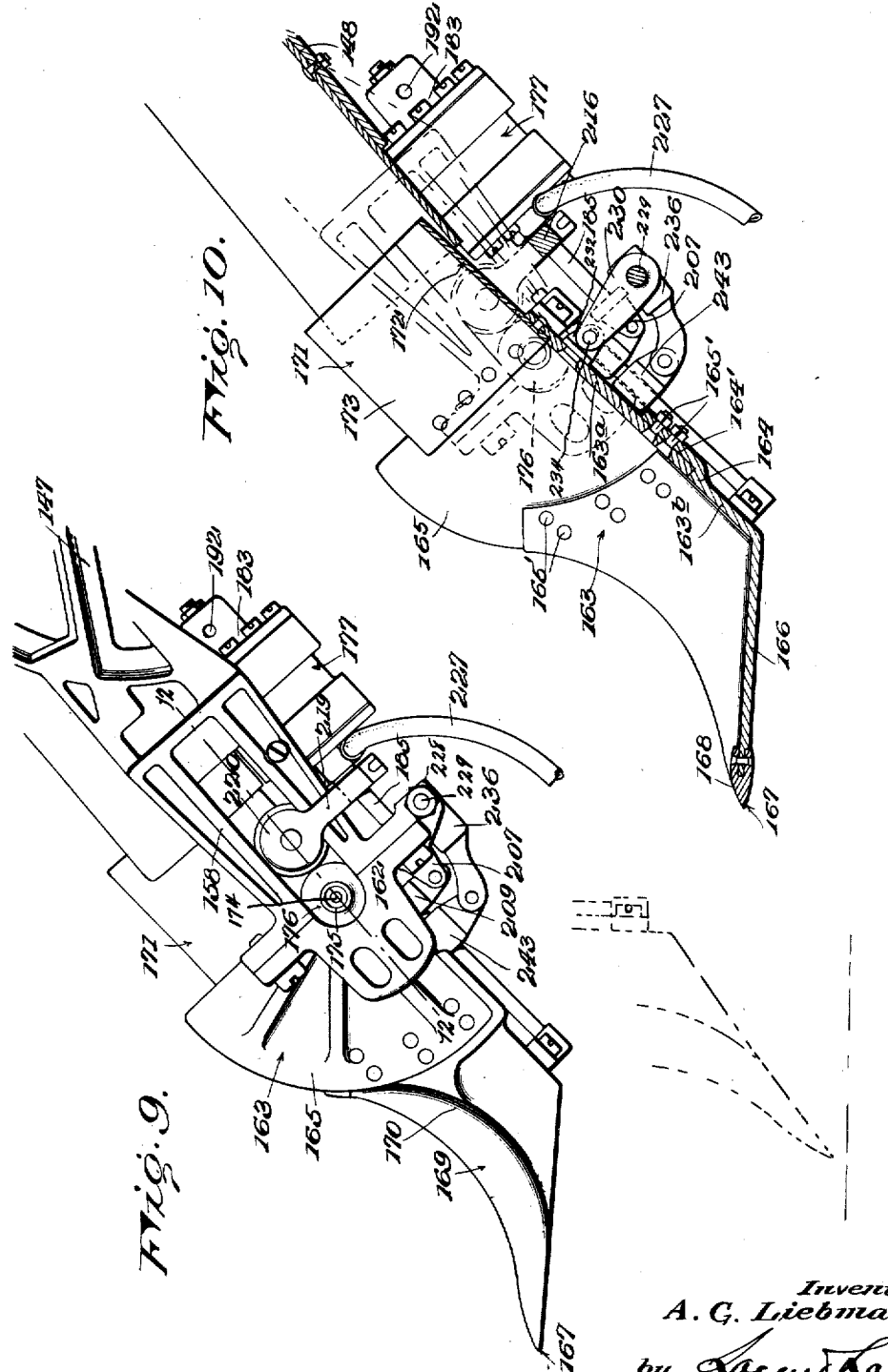
Inventor:
A. G. Liebmann
by Lacey & Lacey,
his, Attorneys.

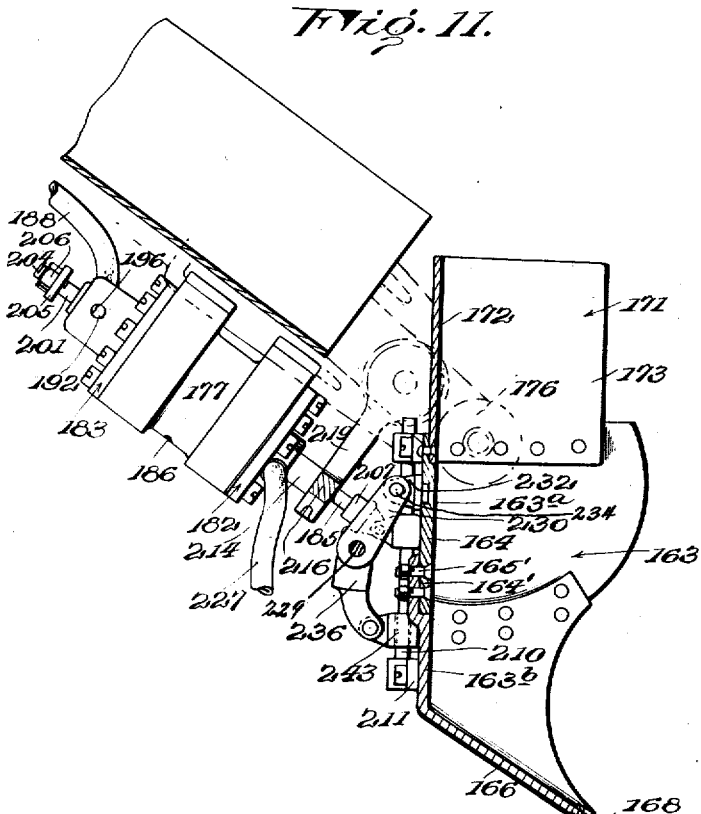
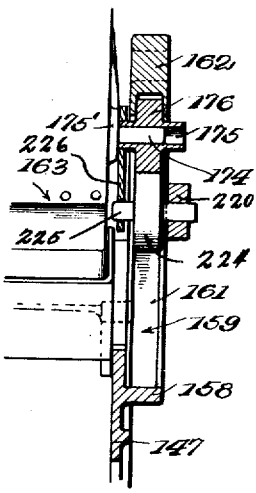

Jan. 15, 1924. 1,480,623
A. G. LIEBMANN
AUTOMATIC FLUID PRESSURE OPERATED MACHINE SHOVEL
Filed July 7, 1919 16 Sheets-Sheet 11
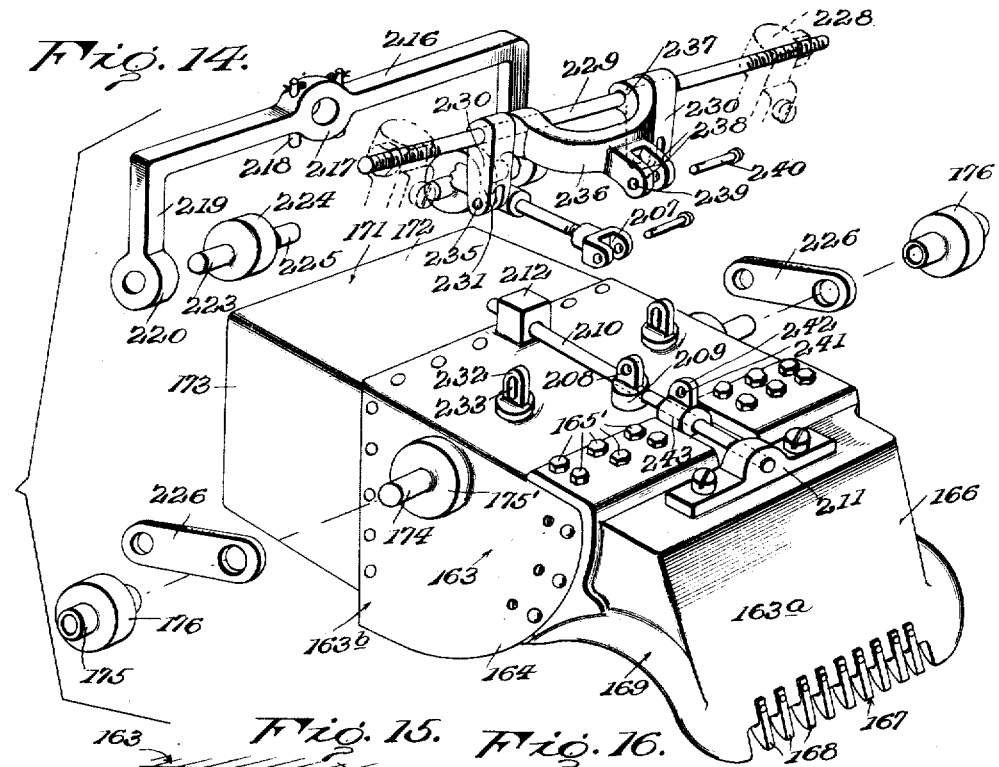
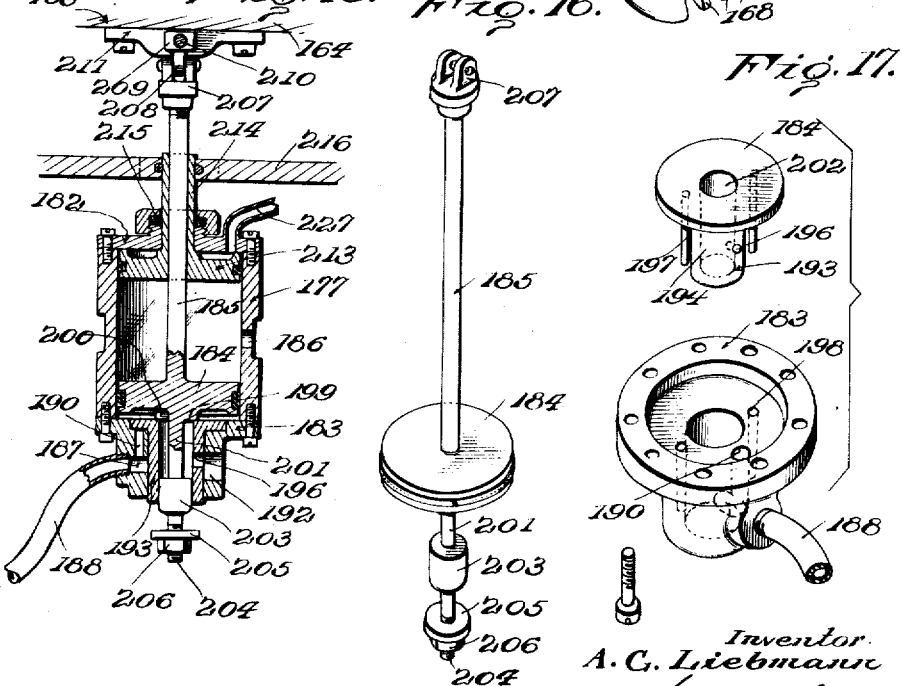
Inventor
A. G. Liebmann
by Lacey & Lacey
Attorneys

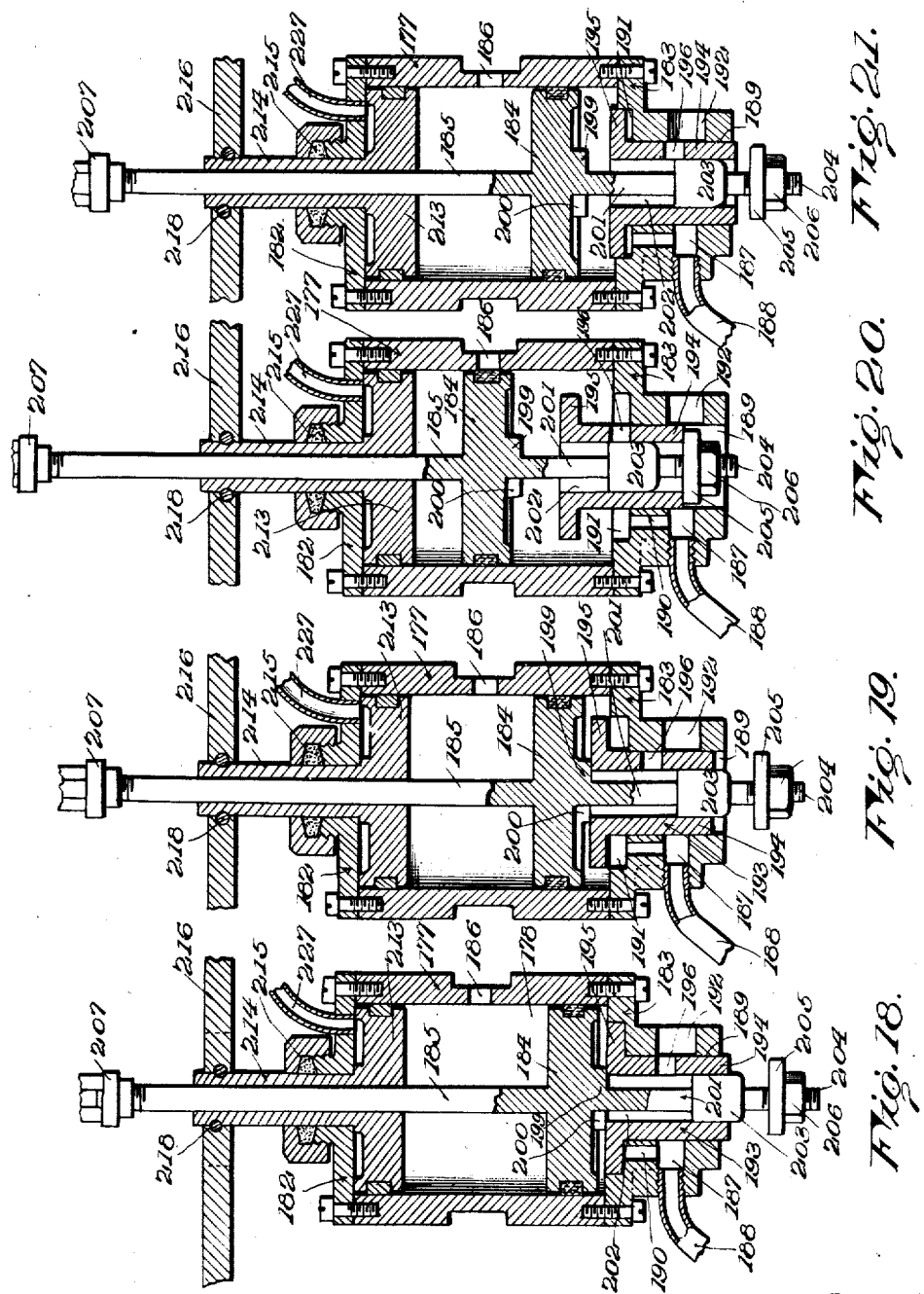

Jan. 15, 1924. 1,480,623
A. G. LIEBMANN
AUTOMATIC FLUID PRESSURE OPERATED MACHINE SHOVEL
Filed July 7, 1919 16 Sheets-Sheet 13
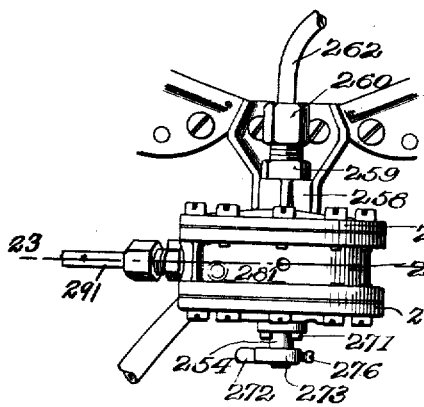
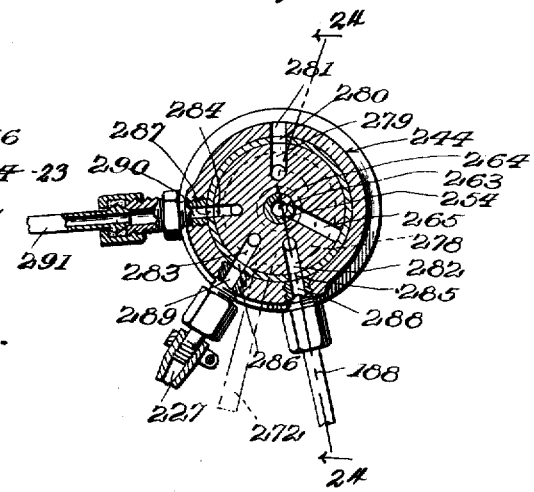
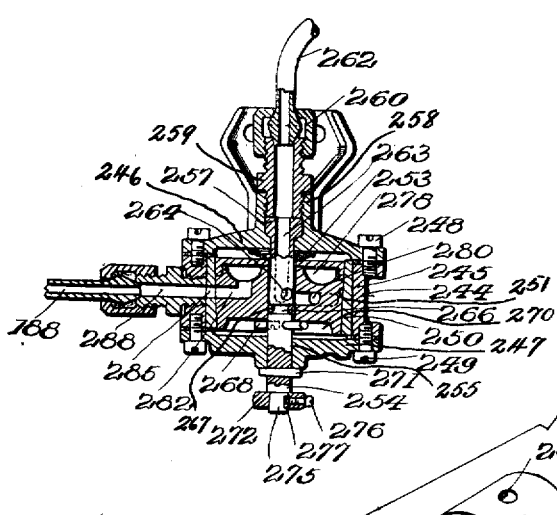
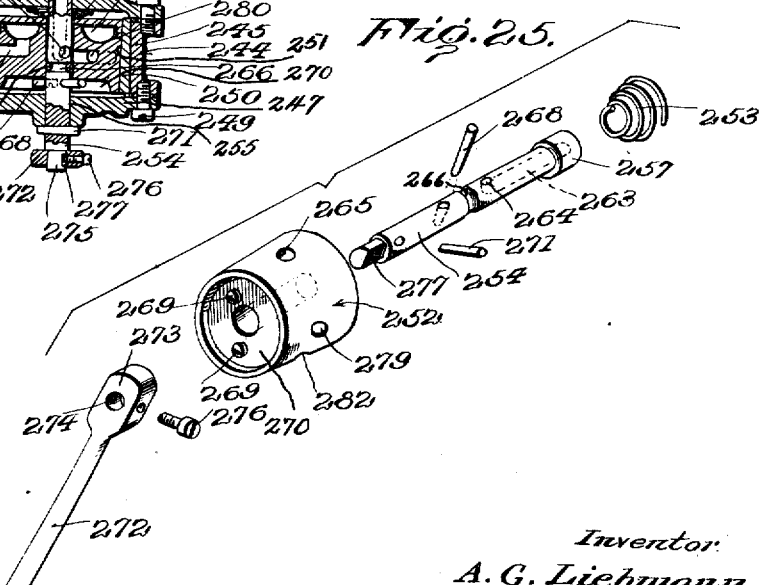
Inventor:
A. G. Liebmann
by Larry & Larry
his Attorneys Jan. 15, 1924.  1,480,623
A. G. LIEBMANN
AUTOMATIC FLUID PRESSURE OPERATED MACHINE SHOVEL
Filed July 7, 1919   16 Sheets-Sheet 14

Inventor
A. G. Liebmann
by Lacey & Lacey,
his Attorneys.

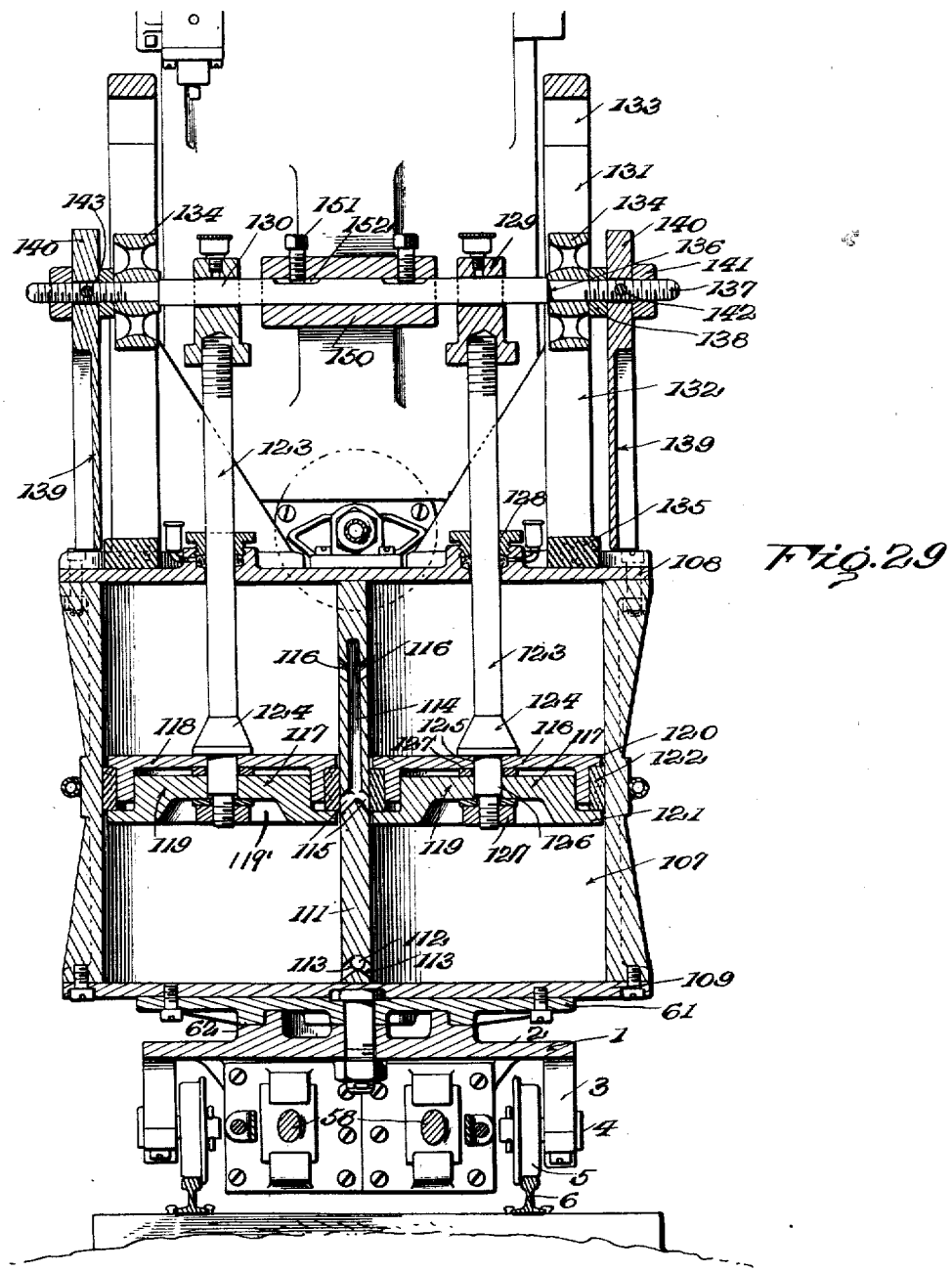

Jan. 15, 1924.　　　　　　　　　　　　　　　　1,480,623
A. G. LIEBMANN
AUTOMATIC FLUID PRESSURE OPERATED MACHINE SHOVEL
Filed July 7, 1919　　　16 Sheets-Sheet 16
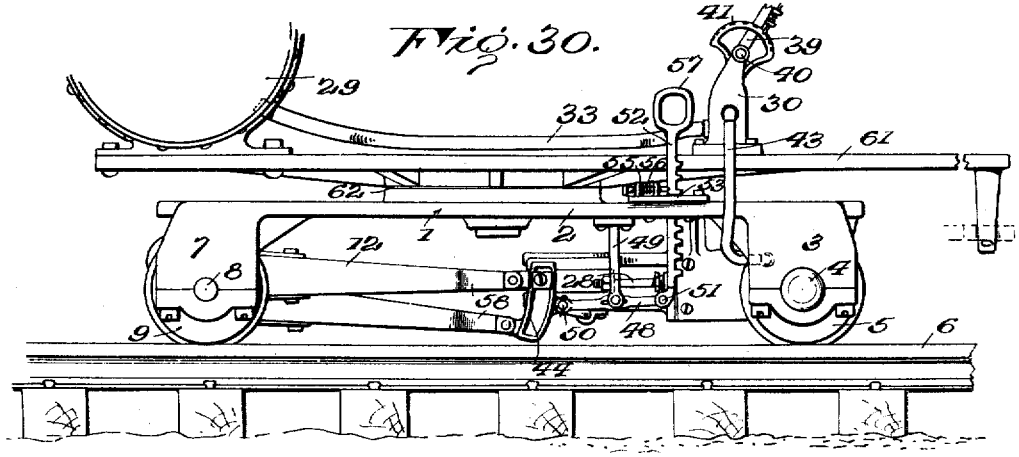
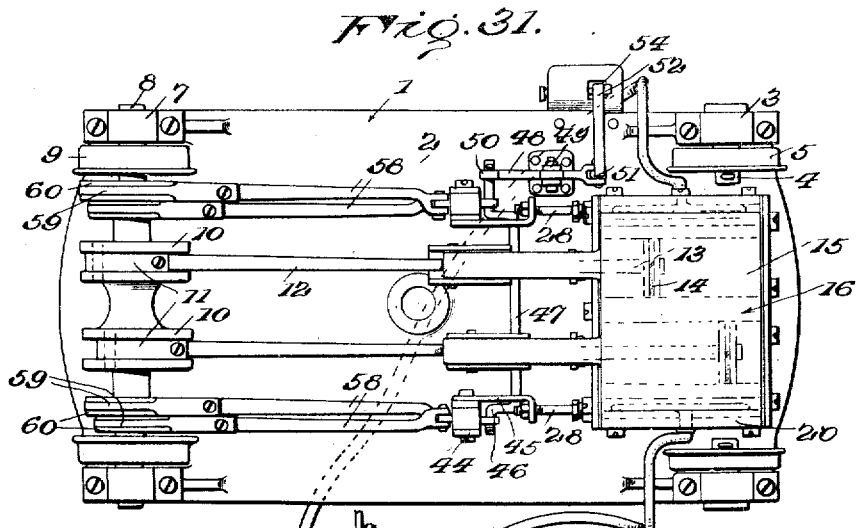
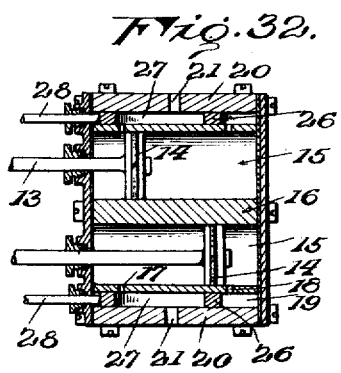
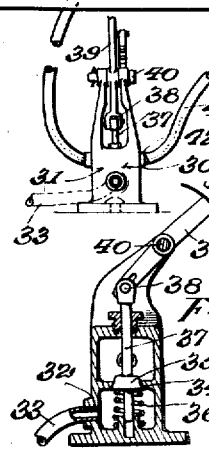
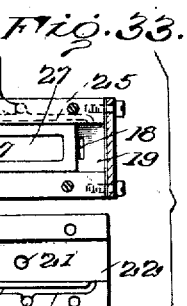
Inventor
A. G. Liebmann
by Lacey & Lacey
his Attorneys Patented Jan. 15, 1924.

1,480,623

UNITED STATES PATENT OFFICE.

AUGUST G. LIEBMANN, OF CHICAGO, ILLINOIS.

AUTOMATIC FLUID-PRESSURE-OPERATED MACHINE SHOVEL.

Application filed July 7, 1919. Serial No. 309,053.

*To all whom it may concern:*

Be it known that I, AUGUST G. LIEBMANN, a citizen of the United States, residing at Chicago, in the county of Cook and State of Illinois, have invented certain new and useful Improvements in Automatic Fluid-Pressure-Operated Machine Shovels, of which the following is a specification.

This invention relates to fluid-pressure-operated shoveling machines.

As exemplified by the prior art there have been numerous attempts to devise a shoveling machine capable of effectively handling loose material, such for example as coal, coke, ore, rock, earth, sand, gravel, etc., but when put to the test of operation under actual working conditions, the large majority of such machines, whether of one type or another, have been found to be inefficient if not impracticable. For example, the ordinary steam shovel requires considerable space for its operation; the operation of excavating or taking up a load is accomplished by a direct forceful scooping entry of the shovel element of the machine into the material; the shovel requires to be swung laterally, usually a considerable distance, to a point where it can be dumped; the stresses imposed upon the machine and the operating mechanism thereof, particularly where the shovel meets unresisting obstructions, are terrific; and, several attendants are necessary for the operation of such a machine and they must be highly skilled in their work or great damage will be caused and the results will, in other respects, be wholly unsatisfactory. Furthermore, the size and mode of operation of steam shovels of the ordinary type precludes their universal use. In some classes of work as for example in excavating, they may prove satisfactory to a certain degree but it is obvious that they could not be employed for some other classes of work where loose material is to be handled, as for example in tunneling, or in mines. It is true that other types of shoveling machines have been devised, designed primarily for use in tunneling, or for use in mines, or for use in other places where the head room is more or less restricted, and some have been designed with a view to their use under conditions where space in a lateral direction is also limited, but in practically every instance, so far as I am aware such machines have been so constructed as to render it impracticable to place them for operation, as for example in a mine tunnel, without the necessity of practically dismantling the entire machine and then setting it up at the operative point which is, of course, of great disadvantage particularly where the work is to be done underground.

Another disadvantage possessed by practically all such machines is that they are substantially immobile and inflexible with the result that they cannot be operated to handle the material in an expeditious and effective manner. Usually the transfer or dumping of the material after it has been taken up is effected in a most indirect manner and not infrequently with likelihood of the material being considerably scattered. Also such machines are usually so constructed as to act upon the material in such a positive manner that damage will result if the shovel element of the machine meets with an unyielding obstruction or the shovel will first hang and then be so suddenly released as to throw the material about or itself strike against some fixed obstruction, as for example the roof of the tunnel or the like in which the machine is operating, thereby causing serious damage. Also in the operation of a great number of such machines the transfer or dumping of the material is accomplished only by slow acting means such for example as traveling conveyors. It is a well known fact that in handling some kinds of loose material as for example coal, coke, rock, and the like, by manual implements as for example a shovel, the most effective method is to enter the pile of material with a lateral scooping movement, as less force is required and the shovel may be more readily and quickly filled in this manner than by attempting to force the shovel directly into the pile of material, and yet it is by this latter method that the shovel element of practically every shoveling machine is caused to act upon the material.

In view of the above the present invention has as its general object to provide a shoveling machine in which the disadvantages stated are all overcome as well as are other minor disadvantages possessed by previously designed machines of this general class, and the more specific objects of the invention will now be enumerated.

The invention has as one of its objects to provide a machine shovel adapted for universal use in the loading, unloading, and similar transfer or handling of coal, coke, ore, rock, earth, sand, gravel, and in fact any loose material which it is required to handle in bulk.

Another object of the invention is to provide a shoveling machine having a practically unlimited field of usefulness, it being adapted for employment in mines, in the construction of tunnels, in irrigation work, in handling material at smelters and manufacturing plants, in loading and unloading house or box cars, and in fact in construction work of any kind where it is required to handle loose material or to excavate relatively loose material even under conditions where head room and side room are greatly limited.

Another object of the invention is to so construct the shoveling machine that without the disassemblage of any of the parts thereof, it may be readily adapted to be raised and lowered on mine cages in mine shafts and transported from place to place through the restricted galleries and passage-ways in mines or through narrow tunnelways or narrow ditches or other excavations.

Another object of the invention is to provide a fluid-pressure-operating shoveling machine possessing features of construction rendering it in its entirety substantial and free from intricate parts or mechanisms which would be liable to become disarranged or damaged under the great stresses imposed upon a machine of this class in operation, the invention having at the same time, as a further object, to provide extremely simple means whereby the operation of the machine may be readily and accurately controlled by one attendant alone.

A further object of the invention is to so construct the machine and the mechanisms for controlling its operation, that the operation of the machine will be flexible to a maximum degree, thus enabling the attendant to so control the operation of the machine as to most effectually and expeditiously handle the material being acted upon.

As is usual in machines of this general class, the machine of the present invention embodies a shovel or scoop element, and a further and important object of the invention is to provide means for imparting to this element an impulsive scooping movement so that as the machine is moved to act upon the material, the shovel will be caused to enter the material in the most effective manner and will, by reason of the peculiar movement imparted to it, automatically load itself to its maximum capacity.

The invention also contemplates operating the shovel element by a fluid-pressure means so constructed and operating in such a manner that the operation of the said shovel element will be cushioned to such a degree as to preclude its damage upon meeting with an unyielding obstruction.

Another object of the invention is to so construct the operating means for the shovel element that the fluid-pressure will be relieved in the event an unyielding obstruction, as for example a large rock, lodges beneath the bottom of the shovel element so that under these conditions the shovel will not pound upon the obstruction but will remain relatively stationary until withdrawn from engagement with the obstruction or until the obstruction is removed or displaced.

A further object of the invention is to provide, as a means for actuating the shovel element, an impulse motor constructed upon a novel principle and capable of imparting rapid impulsive movement to the shovel element in a manner to cause the same to enter the material in the most expeditious and effective manner.

Still another object of the invention is to provide an impulse motor which, while being here employed for the specific purpose stated, may be put to many other uses and which motor will be devoid of complicated valve mechanism, embodying as it does but a simple means whereby the reciprocation of a piston in a cylinder is brought about through the admission of fluid under pressure to one end only of said cylinder.

Another object of the invention is to so construct the means for imparting impulsive scooping movement to the shovel that the means will be automatically rendered inactive in the event the working edge of the shovel meets an unyielding obstruction such for example as an exceptionally large lump of coal, rock or ore, the fluid under pressure, in such event being bled from the actuating means so that the said means will not act against the shovel in a manner which would be liable to cause damage to the shovel or to the means for supporting the same.

A further object of the invention is to provide in a machine of this class, means for imparting impulsive scooping movement to the shovel element in such a manner that as the machine is advanced toward the material being handled, the shovel will enter the material and will automatically take up the material until a load has been accumulated in the shovel.

A further object of the invention is to provide actuating means for the shovel operable to impart to the shovel a direct scooping movement so that where relatively fine material is being handled, such for example as sand, gravel, crushed ore and the like, the shovel may be actuated to directly take up a load without the necessity of imparting the impulsive scooping movement to the shovel. Also through the provision of means for actuating the shovel in this manner, where a relatively large rock or lump of coal or the like is in the path of the shovel and is neither too bulky nor too heavy to be received within the shovel and lifted by the machine, the same may be directly picked up by the shovel without resorting to the impulsive scooping movement.

Another object of the invention is to provide for the positive or direct movement of the shovel in the manner above stated so that in the ordinary operation of the machine after the shovel has been operated with the impulsive scooping movement until it has accumulated a load, the direct acting means may be brought into use to move the shovel to position where it will discharge into a chute supported in juxtaposition thereto, upon tilting of the assemblage comprising the shovel and chute.

As indicated above, the machine includes, in addition to the shovel, a chute by way of which the load of material taken up by the shovel is to be discharged or dumped and these two parts or elements are supported in such a manner that while the shovel is capable of the movements heretofore briefly described, independently of the chute, the assemblage is movable as a whole to dumping position, and therefore a further object of the invention is to provide means whereby the assemblage may be moved with an upward tilting movement to such position that the load accumulated within the shovel will be discharged by gravity into the chute and will pass down the chute and be dumped therefrom.

Another object of the invention is to so construct the means for moving the assemblage into and out of dumping position that the movement will be cushioned and may therefore be effected in a steady and yet positive manner so as to provide against scattering of the material and so as to insure of even and uniform operation of the mechanism.

In this connection it is a further object of the invention to provide an extremely simple fluid-pressure controlled means for moving the assemblage of shovel and chute into and out of dumping or discharging position and for automatically cushioning such movement.

A still further object of the invention is to provide means for automatically locking the shovel in discharging position with relation to the chute at the time of functioning of the means heretofore referred to as provided for positively moving the shovel to the stated position after it has taken up its load or at the time it is loaded by a direct scooping movement, so that as the assemblage is elevated to the discharging position, the shovel will be rigidly held in such position that when the assemblage assumes the proper angle, the load of material within the shovel will be discharged by gravity by way of the said chute.

A further object of the invention is to so construct the means for moving the assemblage of shovel and chute to discharging position that at a point in such movement of the assemblage the same may be manually moved to such position that it will extend substantially directly vertically, thus enabling the machine as a whole to be raised and lowered on a mine cage or otherwise transported under conditions where such positioning of the assemblage will best adapt the contour of the machine as a whole to conform to the space in which it is to be moved.

In connection with the means provided for moving the assemblage of shovel and chute to discharging position, the invention has as another of its objects to provide a break pin connection arranged to automatically relieve the parts in the event the shovel is, through inadvertence, brought into direct contact with the wall of an excavation, tunnel or the like during the operation of moving the assemblage to the position stated.

The invention also contemplates the provision of means whereby the machine may be laterally swung so that the shovel may operate upon a relatively wide pile of material and, furthermore, so that the shovel may be given a lateral swinging or sweeping motion whereby it may more readily enter the material being handled.

Another object of the invention is to provide means for automatically returning the shovel to centered position from any position to which it may have been brought through its lateral swinging movement.

The invention also contemplates providing for simultaneous swinging of the shovel to centered position and of the shovel and chute to position for discharge of the accumulated load.

The invention further has as its object to provide means for automatically rendering active the means for returning the shovel to centered position upon operation of the means for moving the shovel to discharging position with relation to the chute.

Another object of the invention is to provide in a machine of this general class, a shovel especially constructed to adapt it to be moved or swept laterally through the material to be handled so that due to this construction and to the provision of the means whereby the shovel may be swung bodily laterally toward centered position and at the same time moved upwardly with the chute toward discharging position, the movements incident to manual shoveling of loose material may be more or less accurately simulated to insure of handling of the material in the most efficient manner.

The invention has as a still further object to provide novel means of locomotion of the truck or turntable upon which the machine is mounted so that the machine may be caused to advance toward the material or to travel away from the same to any desired distance at the will of the attendant.

In the accompanying drawings:

Fig. 2 is a side elevation of the machine in the position shown in Fig. 1;

Fig. 3 is a side elevation of the machine in operation in a mine tunnel, the shovel and chute assemblage being shown in full lines in dumping or discharging position and in dotted lines in working position;

Fig. 4 is a top plan view of the machine in the position shown in Fig. 3;

Fig. 5 is a rear elevation of the machine in the dumping position shown in Fig. 3;

Fig. 6 is a side elevation of the machine adjusted to permit of its being loaded on a mine cage for raising or lowering.

Fig. 7 is a rear elevation of the machine adjusted as shown in Fig. 6;

Fig. 8 is a view illustrating the manner in which the machine is to employed in unloading a house or box car, the machine being shown in side elevation and the shovel and chute assemblage being shown in dumping or discharging position;

Fig. 9 is a side elevation of the shovel of the machine and its associated parts, the shovel being shown locked in discharging position with relation to the chute;

Fig. 10 is a vertical longitudinal sectional view through the shovel and its associated parts in the position shown in Fig. 9;

Fig. 11 is a view similar to Fig. 10 but illustrating the shovel in initial position for scooping and digging;

Fig. 12 is a longitudinal sectional view taken substantially on the line 12—12 of Fig. 9;

Fig. 13 is a horizontal sectional view taken substantially on the line 13—13 of Fig. 3;

Fig. 14 is a perspective view looking at the under side of the shovel, the view illustrating also the parts associated with the shovel;

Fig. 15 is a detail longitudinal sectional view through the fluid-pressure means for controlling the operation of the shovel and which means embraces the impulse motor of the machine;

Fig. 16 is a perspective view of the piston of the motor shown in Fig. 15 and its associated parts;

Fig. 17 is a group perspective view illustrating one head of the cylinder of the motor and the valve of the motor;

Fig. 18 is a detail longitudinal sectional view through the structure shown in Fig. 15 and illustrating the piston and valve of the impulse motor in normal or initial position;

Fig. 19 is a similar view illustrating the first movement in the operation of the piston and valve;

Fig. 20 is a similar view illustrating another position assumed by the piston and valve in the operation of the motor;

Fig. 21 is a similar view illustrating still another position of the piston and valve;

Fig. 22 is a top plan view of the manually operable throttle valve for controlling the operation of the shovel and the movement of the shovel and chute assemblage into and out of dumping position;

Fig. 23 is a vertical sectional view taken substantially on the line 23—23 of Fig. 22;

Fig. 24 is a vertical longitudinal sectional view taken substantially on the line 24—24 of Fig. 23;

Fig. 25 is a group perspective view illustrating the throttle valve removed from its casing;

Fig. 29 is a vertical transverse sectional view through the fluid pressure means for effecting raising and lowering of the shovel and chute assemblage into and out of dumping position;

Fig. 30 is a side elevation of the truck upon which the machine is mounted and illustrating in elevation the means providing for locomotion of the truck whereby the machine may be advanced toward and caused to travel away from the material to be handled;

Fig. 31 is a bottom plan view of the truck shown in Fig. 30;

Fig. 32 is a detail horizontal sectional view through the cylinders of the fluid-pressure truck motor shown in Figs. 30 and 31;

Fig. 33 is a group view illustrating a side elevation of the valve chest and valve for the truck motor and a side elevation of the inner side of the head of the valve chest;

Fig. 34 is a detail vertical sectional view through the controlling valve for the truck motor shown in Figs. 31 and 32;

Fig. 35 is a detail side elevation of one of the guides for the means for raising and lowering the shovel and chute assemblage into and out of dumping position and illustrating an attachment which may be employed under conditions to be presently explained.

Fig. 36 is a side elevation illustrating a modification of the invention.

Figure 1:
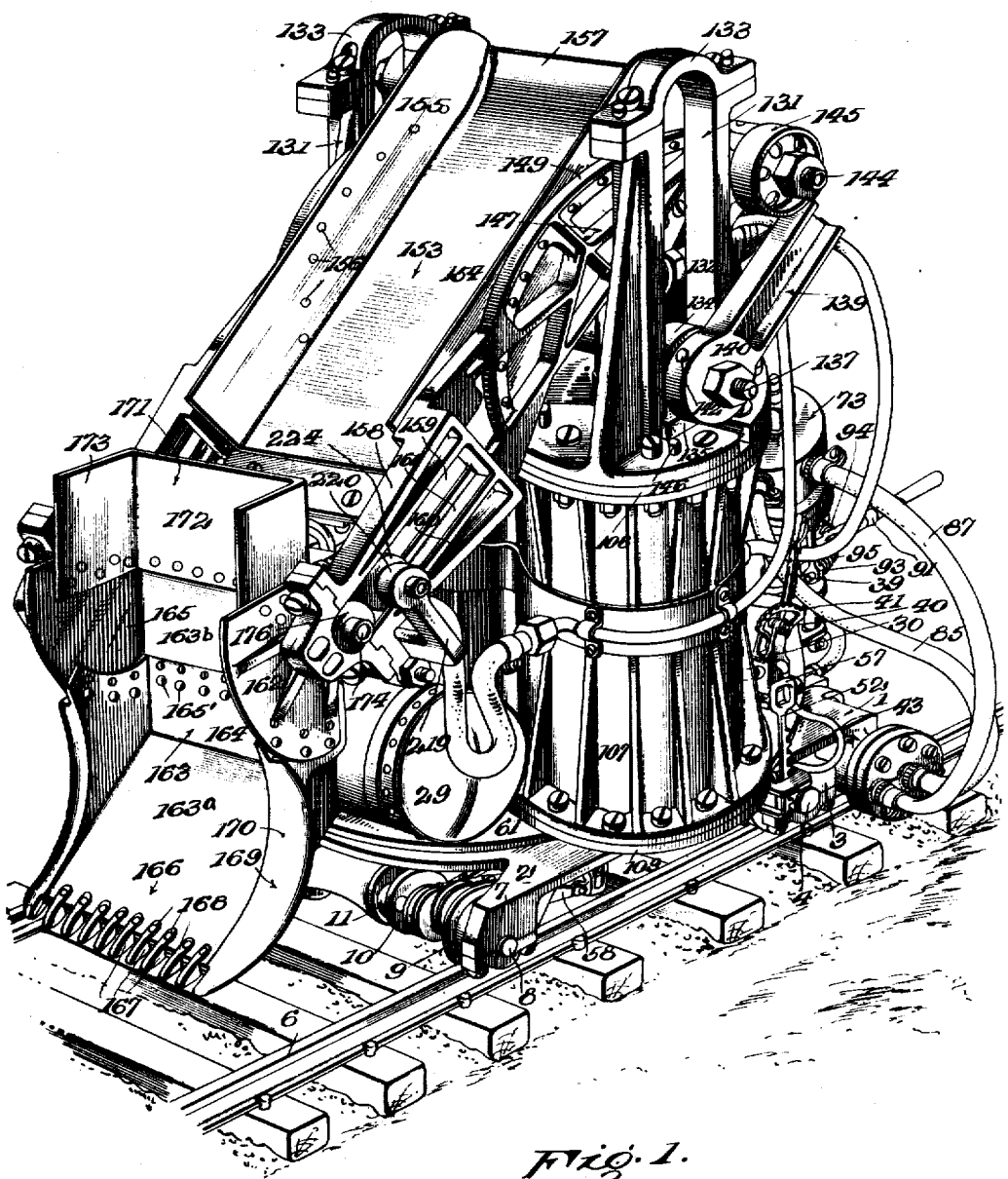
Figure 1 is a perspective view of the automatic machine shovel embodying the present invention, the same being shown in position for operation to act upon the material to be handled to take up a load.

In order that the machine embodying the present invention may be moved toward and from the work either upon the ground surface or upon track rails laid for the purpose, the same is mounted upon a wheeled truck provided with means whereby it may be impelled in a forward or rearward direction. This truck is indicated in general in the drawings by the numeral 1 and comprises a platform 2 upon the under side of which at the rear end thereof are fixed bearings 3 in which are mounted stub axles 4 carrying wheels 5 which may be of the flat rim type adapting them to travel over the ground surface or of the flanged type adapting them to travel over track rails, which rails are indicated in the drawings by the numeral 6. Other bearings 7 are fixed beneath the platform 2 at the forward end of the truck, and journaled in these bearings is an axle 8 upon which are fixed wheels 9 corresponding in type to the wheels 5. The axle 8 is provided at its central portion with opposed cranks 10 engaged by bearings 11 at the forward ends of pitman rods 12 connected with the rods 13 of pistons 14 which operate in the cylinders 15 of a fluid pressure motor which is indicated in general by the numeral 16, this motor constituting the means for propelling the truck forwardly or rearwardly, and the reciprocation of the pistons in the cylinders of the motor transmitting motion through the pitman rods 12 to the axle 8 and its wheels 9.

The motor 16 is preferably operated through the medium of compressed air and the admission of air to and the exhaust thereof from the cylinders of the motor is automatically controlled by slide valves which will now be described. Each cylinder 15 of the motor is provided in its outer side with ports 17 and 18 which provide both for the intake of the compressed air and the exhaust thereof. This side or wall of each cylinder is formed to provide a valve chest 19 closed by a head or cover plate 20 having an exhaust port 21 formed therein at a point intermediate of its ends. The cover plate 20 is recessed as indicated by the numeral 22 to receive the slide valve which will be presently described, and the said plate is formed with an intake port 23 and in its inner face with passages 24 and 25 which lead in opposite directions and open through the upper wall of the recess 22 as clearly shown in the upper view of Fig. 33 of the drawings. The slide valve above referred to is indicated in general by the numeral 26 and the said valve is of grid formation and has a longitudinally extending opening or chamber 27, the valve being fitted for reciprocatory motion within the chest 19 and the recess 22. The rod of the valve is indicated by the numeral 28 and the said rod connects with a link motion to be presently described. By reference to the upper view of Fig. 33 it will be observed that when the valve 26 is at the left hand end of its stroke its upper side will close the passage 24 but its rear end will clear the passage 25. Likewise when the valve is in this position both ports 17 and 18 will be uncovered and the port 17 will be located within the bounds of the opening 27 of the valve, the port 18 being located immediately beyond the rear end of the valve. With the valve in this position, air under pressure will exhaust from the respective cylinder 15 by way of the port 17, opening 27, and port 21, air under pressure being admitted to the cylinder at the opposite side of the piston head through the passage 25 and port 18. Of course, when the valve is shifted to the right in the said view of Fig. 33, the passage 24 will be uncovered, the port 17 will be located beyond the forward end of the valve, and the port 18 will be located within the bounds of the opening 27 of the valve, the passage 25 being closed. With the valve moved to this position air will exhaust from the respective cylinder 15 at the last mentioned side of the piston by way of said port 17, opening 27, and port 21, air under pressure being admitted to the opposite end of the cylinder through the passage 24 and port 17. It will be observed that the ports 17 and 18 constitute both intake and exhaust ports in the operation of the slide valve.

Air is supplied to the truck motor from a compressed air tank 29 which is coupled to the usual compressed air line which feeds rock drills by trailing hose 29' located preferably at the forward side of the turntable which is mounted upon the truck 1 and which will presently be described, and the supply of air is controlled by the valve shown most clearly in Fig. 34 of the drawings and indicated in general by the numeral 30. The said valve comprises a casing 31 which is also mounted upon the turntable above referred to, this casing being provided with an inlet port 32 with which is connected one end of an air conducting pipe 33, the other end of the pipe being connected with the compressed air tank or reservoir 29. Interiorly the casing 31 is formed with a valve seat 34 against which rests a valve 35 normally held closed by a spring 36 bearing upon its lower side, the valve being arranged to open in a downward direction and being provided with an upwardly extending stem 37 passing through the top of the valve casing and pivotally connected as at 38 with the lower end of a hand lever 39 mounted for rocking movement as at 40 and adapted to be held in positions of adjustment by a pawl and rack device 41. In its opposite sides the valve casing 31' is formed with outlet ports 42 located above the valve seat 34, and pipes 43 lead from these ports and connect respectively with the inlet ports 23 of the cover plates of the valve chests for the two cylinders 15 of the motor 16. It will now be understood that when the lever 39 is operated to lower the valve 35 from its seat, air under pressure entering the valve casing through the pipe 33 will pass the valve and be conducted by the pipes 43 to the valve chests of the two cylinders of the motor thus setting the motor in operation to impart travel to the truck. The speed of travel of the truck is, of course, regulated by the extent to which the valve 35 is moved to open position and the operation of the motor may, of course, be so controlled as to advance the shovel of the machine slowly toward the material and, when desired, withdraw the same relatively quickly from the material.

The link motion provided for operating the slide valve 26 includes link blocks 44 with which are slidably connected arms 45 extending forwardly from and carried by the valve rods 28. These link blocks are supported upon the crank ends 46 of a rock shaft 47 mounted beneath the platform of the truck, it being understood that the link blocks will be raised or lowered upon rocking of the said shaft 47. In order that this rocking movement of the shaft may be brought about, a rock arm 48 is mounted upon a bracket 49 beneath the platform 2 and is pivotally connected at one end as at 50 with one crank end of the said shaft 47 as clearly shown in Figs. 30 and 31 of the drawings. To the other or rear end of this rock arm is pivotally connected as at 51 the lower end of a rack bar 52 slidably mounted through a bearing plate 53 upon the truck platform 2, the rack bar preferably passing through a slot 54 in the said plate and having its teeth engageable interchangeably with one end wall of the slot. In order to hold the rack bar in position with its teeth engaging the wall of the slot, a thrust pin 55 is mounted upon the plate 53 and is caused to normally bear yieldably against one side of the bar 52 by means of a spring 56 mounted upon it. At its upper end the bar is provided with a handle 57 whereby it may be conveniently raised and lowered, it being understood that in order to effect movement of the bar the same is to be rocked in a forward direction upon its pivot 51 against the tension of the spring 56 and until its teeth have been brought out of engagement with the end wall of the slot 54. The numeral 58 indicates link rods connected with the upper and lower ends of the respective link blocks 44 and at their opposite ends provided with eccentric straps 59 to engage eccentrics 60 upon the axle 8. It will now be evident that as the axle is rotated, oscillatory motion will be imparted to the link blocks and transmitted to the slide valves 26. By raising and lowering the links to the medium of the lever 52, the motion may, of course, be reversed.

The turntable above referred to is indicated in general by the numeral 61 and the said table is mounted for turning movement in any suitable manner as indicated by the numeral 62, upon the upper side of the platform 2 of the truck 1. This turntable may be of any desired construction and as previously pointed out, supports the main portion of the mechanism embodying the invention. This table is, of course, bodily movable with the truck 1 and operatively connected with means manually controllable whereby it may be turned in either direction so as to suitably laterally swing the shovel and chute assemblage of the machine so as to present the shovel to the material to be handled in the desired manner and position. The movement of the turntable is effected by a fluid-pressure-operated means constituting a prime mover indicated in general by the numeral 63 and comprising a cylinder 64 in which works a piston comprising a head 65 and a rod 66, the said rod extending through one head of the cylinder 64 and being pivotally connected by a yoke 67 with a lever 68 loosely pivoted at one end as at 69 to a bracket 70 which may be fixed at any convenient point upon the truck 1 or fixed with relation to the cylinder 64 which latter is fixedly mounted upon the said truck. The other end of the arm 68 is formed with a slot 71 pivotally receiving the lower end of a stud 72 which projects from the under side of the rear end of the turntable 61. It will now be understood that upon movement of the piston 65 in the cylinder 64, swinging motion will be imparted to the arm 68 in one direction or the other and this motion will be transmitted to the turntable 61 so as to turn the table in one direction or the other.

Figure 26:
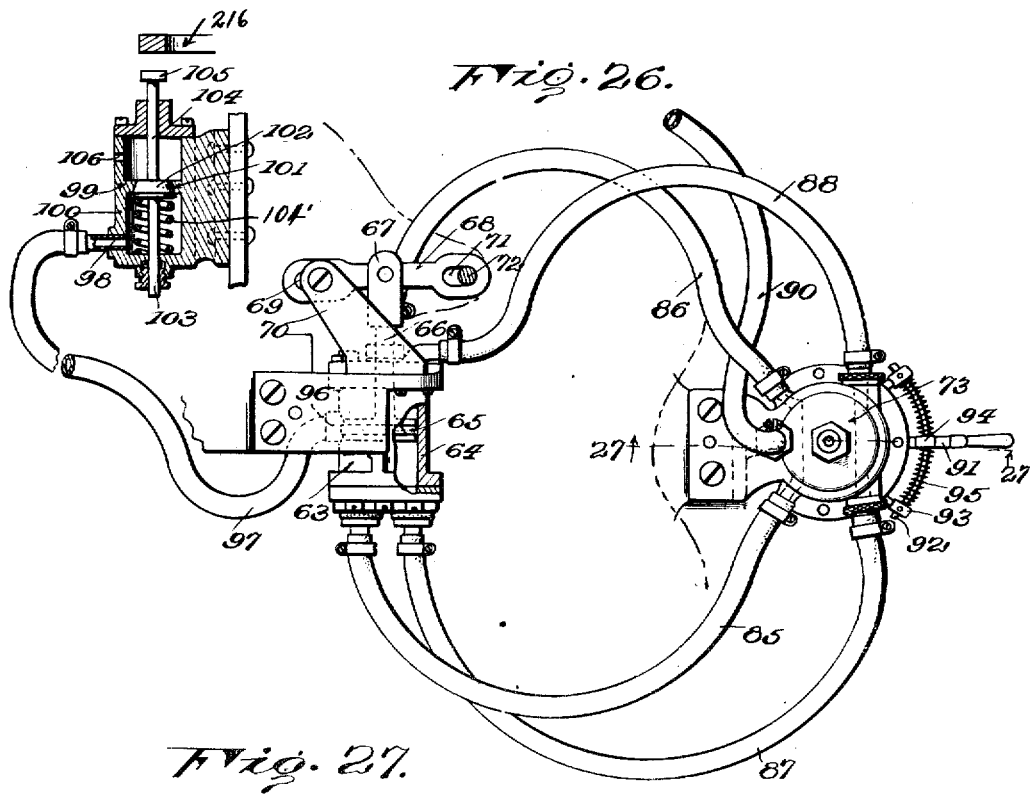
Fig. 26 is a top plan view of the shift valve and fluid pressure controlled means for laterally swinging the machine and illustrating also the means provided for automatically effecting return of the machine to centered position.
Figure 27:
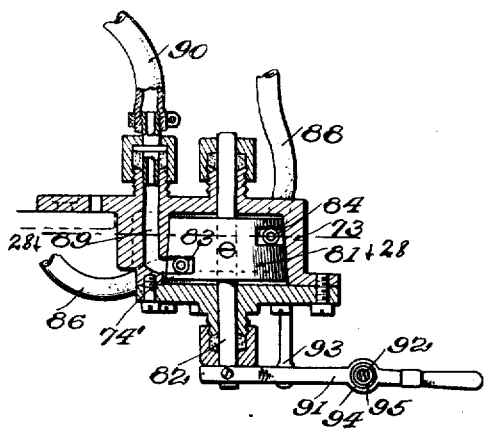
Fig. 27 is a vertical sectional view taken substantially on the line 27—27 of Fig. 26.
Figure 28:
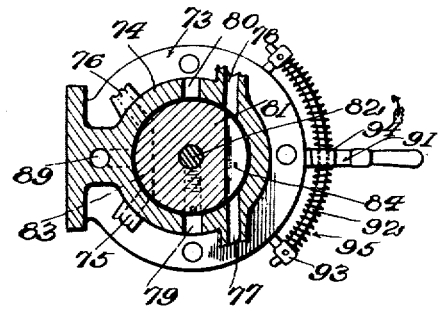
Fig. 28 is a horizontal sectional view taken substantially on the line 28—28 of Fig. 27.

The movement of the piston 65 is controlled through a manually operable valve shown most clearly in Figs. 26, 27 and 28 of the drawings and indicated in general by the numeral 73. The said valve comprises a casing 74 bolted or otherwise secured in any suitable manner to a fixed portion of the machine, preferably at the rear of and upon and between the hoist cylinders of the shovel and chute assemblage raising and lowering means to be presently described. The casing is provided with inlet ports 75 and 76, exhaust inlet ports 77 and 78, and exhaust ports 79 and 80. The valve body is indicated by the numeral 81 and the said body is tapered and is rotatably mounted within the casing 74 of the valve, this casing being interiorly tapered to snugly receive the valve body. The body is provided with a stem 82 extending through the upper and lower sides of the valve casing. In order that the valve body may be caused to at all times fit snugly in its casing, the wall of the casing near the bottom is formed with a small leak passage 74' by way of which the fluid under pressure may enter the space between the bottom of the valve casing and the underside of the valve body and by its pressure force the body upwardly in the casing. Passages 83 and 84 are cut in the sides of the valve body 81 at diametrically opposite sides thereof and these passages are relatively offset in a vertical direction as clearly shown in Fig. 27, the passage 83 being arranged to communicate with the ports 75 and 76 and the passage 84 being arranged to communicate with the ports 77 and 78 and the exhaust ports 79 and 80. Live air conducting pipes 85 and 86 lead respectively from the ports 75 and 76 to the opposite ends of the cylinder 64 and communicate with the interior of the cylinder at opposite sides of the piston. Exhaust conducting pipes 87 and 88 connect with the ports 77 and 78 respectively and are lead to and communicate with the ends of the cylinder 64 with which the pipes 85 and 86 are respectively connected. An inlet port 89 is also formed in the wall of the valve casing 74 and communicates at its inner end with the passage 83. An air conducting pipe 90 is placed in communication with the outer end of the port 89 and leads from the compressed air reservoir 29.

In order that the valve 81 may be rotatably adjusted, a hand lever 91 is mounted upon the lower end of the stem 82 and is adapted to be swung in a horizontal plane beneath the valve casing 74. In order to normally hold the lever 91 in central or neutral position, an arcuate rod 92 is mounted at its ends in suitable brackets 93 upon the under side of the valve casing and extends loosely through an opening 94 formed through the lever 91, springs 95 being arranged upon the said rod at the opposite sides of the lever and bearing at their outer ends against the brackets 93 and at their inner ends against the said lever Normally, these springs, being of equal strength, will act upon the lever to hold the same in the central or neutral position shown in Figs. 27 and 28 of the drawings in which position the valve 81 will occupy the position shown in Fig. 28. With the valve in this position, the passage 83 is in communication with both of the ports 75 and 76 and consequently air under pressure will be admitted to the cylinder 64 at opposite sides of the piston 65, and the pressure being equal upon the opposite sides of this piston the same will be held in the intermediate position shown in Fig. 26. In this position of the piston, the same closes an exhaust or vent port 96 which is formed in its forward side and from which leads an air conducting pipe 97. This pipe communicates at its opposite end with an inlet port 98 located at one end of a poppet relief valve indicated in general by the numeral 99. This valve which is clearly shown in Fig. 26, comprises a casing 100 formed interiorly between its ends with a valve seat 101 to accommodate a valve 102. This valve has a stem 103 extending through one end of the valve casing 100, and a spring 104' is disposed to surround this stem and bears at one end against the said end of the valve casing and at its other end against the head of the valve thus yieldably holding the valve to its seat. The valve is also provided with a stem 104 which extends through the opposite end of the casing and which is provided with an abutment head 105 designed to be engaged by a moving part of the machine under conditions which will presently be explained. A vent opening 106 is formed in one side of the valve casing. Of course, when the piston 65 is in the intermediate position shown in Fig. 26 there will be no escape or exhaust of air through the port 96 and pipe 97. Also when the said piston 65 is in the intermediate position shown, the turntable will be in a centered position and therefore the shovel and chute assemblage supported by the said turntable will be in a position facing forwardly. Should it be desired to swing the turntable, this may be accomplished by swinging the hand lever 91 in the corresponding direction. For example if the hand lever is swung in the direction indicated by the arrow in Fig. 28 of the drawings, the supply of air under pressure to the cylinder through the pipe 86 will be cut off, and the passage 84 will be placed in communication with the exhaust inlet port 78 and the exhaust port 80 so that the air will exhaust from the other end of the cylinder through the pipe 88 and by the passage 84 to the exhaust port 80 thus causing the piston to move in the direction of that end of the cylinder with which the pipe 88 communicates. On the other hand when the lever 91 is swung in the opposite direction, air will exhaust from the cylinder through the pipe 87 and air under pressure will pass into the opposite end of the cylinder through the pipe 86 thus moving the piston in the direction of the first mentioned end of the cylinder. It will be understood that if, after being swung to actuate the mechanism for turning the turntable, and the said valve is released, it will be automatically returned to central or neutral position through the medium of the springs 95. However, this will not effect a return motion of the piston 65 to its intermediate position and as a consequence the shovel and chute assemblage will remain in the position to which it is swung through operation of the said lever 91. However, when under conditions to be presently explained the abutment head 105 upon the stem 104 of the valve 102 is engaged and this valve is moved to open position, the air will be bled from the cylinder at that side of the piston 65 which is at that time in communication with the port 96, the air passing through the pipe 97, the valve casing 100, and out through the vent opening 106. As a consequence the greater pressure upon the opposite side of the piston will cause the piston to move to its intermediate position shown in Fig. 26 in which position the pressure upon its opposite sides is equal. Therefore, it will be understood that when the valve 102 is automatically opened through engagement of the abutment head 105 of its stem, the piston 65 will be automatically returned to intermediate position and this movement of the piston will result in the turntable and the shovel and chute assemblage being likewise returned to intermediate or normal position. Should the lever 91 be swung to one side so as to correspondingly swing the shovel and chute assemblage and should it be desired to return the assemblage to its normal or central position without resort to the automatic operation of the valve 99, this may be accomplished by swinging the said lever 91 in the opposite direction past its central or neutral position and moving the lever back and forth until equal air pressure is established at the opposite sides of the piston 65 and the said assemblage has assumed the position stated. As a specific example of this operation of the controlling valve, let it be assumed that the piston 65 is nearer that end of the cylinder 64 with which the pipe 66 communicates and it is desired to return the piston to its intermediate position as shown in Fig. 26. To accomplish this the lever 91 will be swung in a direction opposite that indicated by the arrow in Fig. 28 thereby cutting off the air from the port 75 and allowing air to enter the said end of the cylinder through the pipe 86. At the same time air in the other end of the cylinder will be bled through the pipe 87 and port 77 and out through the exhaust port 79 so that the piston will be caused to travel in the desired direction. Should it move slightly past its central position, the lever 91 is then to be moved in the direction the opposite of that last stated or, in other words, in the direction of the arrow in Fig. 28 to a sufficient distance past neutral position to bleed the first mentioned end of the cylinder and admit more air to the last mentioned end of the cylinder. Of course, an experienced attendant will be capable of so judging the distance to which the lever is required to be swung that he will ordinarily be required to effect but a single movement of the lever to bring the piston 65 to central position.

The shovel and chute assemblage is supported by the hoisting means which are provided for raising and lowering the assemblage and this means will now be specifically described. The hoisting means is most clearly illustrated in Figs. 7, 13 and 29 of the drawings and includes a pair of fluid pressure cylinders indicated in general by the numeral 107, these cylinders being preferably cast en bloc and being closed at their upper and lower ends by upper and lower heads indicated respectively by the numerals 108 and 109. The cylinders are supported upon the turntable 61 and secured in place by bolts or other suitable securing elements 110 coacting with the turntable and the lower head 109 of the cylinders. The dividing wall between the cylinders is indicated by the numeral 111 and this wall is formed near the lower ends of the cylinders with a fluid conducting passage 112 communicating with the ducts 113 formed in the said dividing wall and each opening into a respective one of the cylinders 107 so that fluid under pressure supplied through the passage 112 will equally enter both of the cylinders. For a purpose to be presently explained the dividing wall 111 between the cylinders is formed with a vertically extending passage 114 communicating at its lower ends with ports 115 each communicating with a respective one of the cylinders and located approximately midway of the height of the wall. At its upper end the passage 114 communicates with other ports, indicated by the numeral 116, each of which likewise communicates with a respective one of the cylinders, these latter ports 116 being located a suitable distance above the ports 115 to provide for the operation which will presently be described.

Working in each of the cylinders 107 is a piston indicated in general by the numeral 117 and comprising a head 118 and a follower 119. The head 118 comprises a short cylindrical body having an integral closed upper end providing a circumferential flange 120. The follower 119 comprises a short cylindrical body telescopically fitting into body of the head 118. The body of the follower is provided with a circumferential flange 121 facing the flange 120, and a piston ring 122 is disposed to surround the body of the head and is loosely received between the flanges 120 and 121. The rod of the piston is indicated in general by the numeral 123 and the same is formed near its lower end with an enlargement 124 engaging the upper face of the head 118, the rod below this enlargement being fitted through aligned openings 125 and 126 formed respectively in the head 118 and follower 119. A nut 127 is threaded onto the lower extremity of the rod and is tightened to bear against the follower 119 to clamp the head and follower together, a spacing washer 127' being fitted upon the piston rod between the head and follower to so space these parts as to prevent binding of the piston ring. The nut 127 and the lower extremity of the piston rod are housed in a recess 119' formed in the underside of the follower 119 so that these parts will not strike the lower heads of the cylinders 107. The piston rods 123 of the two pistons fit slidably through stuffing boxes 128 upon the head 108 of the cylinders and at their upper ends these rods are provided with bearing heads 129 which loosely fit a supporting shaft 130.

As will be presently pointed out in the description of the operation of the machine, when it is desired to raise or elevate the shovel and chute assemblage, fluid under pressure is admitted through the passage 112 and, entering the lower ends of the cylinders beneath the pistons therein, will move the pistons upwardly, correspondingly moving the supporting shaft 130 upon which the said assemblage is mounted. The upward movement of the pistons will continue until their packing rings partially uncover the ports 115 whereupon fluid under pressure will be vented through the passage 114 and ports 116 into the upper ends of the cylinder. Thus with a continuous supply of air through the passage 112, the pistons will be moved upwardly until they assume such a position with relation to the ports 115 that the pressure against their under sides will be exactly sufficient to maintain them in elevated position and without causing any further upward movement. In this manner the pistons will be moved upwardly to elevate the shovel and chute assemblage to dumping position and they will be automatically arrested in their upward movement at this point and will be supported in this position until the lower ends of the cylinders are vented whereupon the pistons will be permitted to descend through the weight of the assemblage which they support and the descent of the assemblage will be cushioned. Likewise it will be evident that the movement of the assemblage to dumping position is cushioned inasmuch as the air by-passed and trapped in the upper ends of the cylinders will be placed under gradually increasing degrees of pressure as the pistons move upwardly.

In order to guide the shaft 130 in its raising and lowering movement, guides 131 are mounted upon the opposite ends of the cylinder head 108, each of said guides comprising spaced portions 132 connected at their upper ends by a yoke 133 bolted or otherwise removably secured in place. Wheels 134 are loosely mounted upon the end portions of the supporting shaft 130 and travel within the guides in the raising and lowering movement of the said shaft, as clearly shown in Figs. 1 and 29 of the drawings. In order to cushion the downward movement of the shaft 130 in its guides 131, so as to absorb any shocks to which the parts might be otherwise subjected, buffer blocks 135 of any suitable cushioning material are positioned in the lower ends of the guides 131 and consequently in the path of downward travel of the wheels 134.

In order that in the raising and lowering of the shovel and chute assemblage, the assemblage may be tilted respectively to dumping position and to position for operation upon the material to be handled, means is provided which will now be described. The portions of the shaft 130 upon which the wheels 134 are mounted are slightly reduced in diameter to provide shoulders 136 to prevent lateral inward movement of the wheels, and the portions of the said shaft outwardly of the said journaling portions are threaded as indicated by the numeral 137, and nuts 138 are fitted thereon to prevent outward movement of the wheels upon the shaft. The numeral 139 indicates in general lever arms each provided at one end with a head 140 fitted onto the threaded portion 137 of the respective end of the shaft 130, nuts 141 being also fitted upon the said portions 137 of the shafts and coacting with the nuts 138 to secure the arms in place thereon. The said arms are connected with the shaft to impart rotative movement to the latter, when the arms are swung, by means of tapered break pins 142 fitted diametrically through the heads 140 of the said arms and through openings 143 in the respective ends of the shaft. While these break pins connect the arms with the shaft to impart rotative movement to the latter, nevertheless should any undue strain be placed upon the parts the pins 142 will be sheared off thus relieving the parts and preventing damage to the more delicate portions of the machine. Dead spindles 144 are mounted upon the guides 131, and idle wheels 145 are loosely mounted upon these spindles. The lever arms 139 are so fixed upon the shaft 130 that when the shaft is in full lowered position the arms will extend upwardly and rearwardly at an angle, as clearly shown in Fig. 2 of the drawings, engaging near their outer ends against the respective wheels 145. It will be evident that when the shaft 130 is raised through upward movement of the pistons 117, the arms 139 will ride against the respective wheels 145 and consequently rotative movement will be imparted to the said shaft 130 as the shaft is being elevated. On the other hand as the shaft is being lowered the arms will ride against the wheels so that the shaft will be rotated in the opposite direction. The purpose of imparting this motion to the shaft will presently be fully pointed out. It is also to be noted at this point and particularly by reference to Figs. 6, 7 and 29 that when the shaft 130 has been elevated to a suitable distance, the arms 139 may be manually swung downwardly so as to extend vertically and so that when the shaft is slightly lowered the lower ends of the arms will rest upon the bases of the upright guides 131 thus providing positive means for supporting the shaft 130 in elevated position even though the source of fluid pressure be disconnected from the machine. Dowel pins 146 fit through the upper head for the cylinders and through the bases of the guides 131 in the manner shown in Fig. 6 of the drawings, and certain of these pins are so positioned that when the free ends of respective lever arms 139 are brought to position resting upon the bases of the adjacent guides, they will seat between the respective pins and will thus be prevented from swinging in either direction to cause a disturbance in the adjustment of the parts.

The chute of the machine is indicated in general by the numeral 147 and the same comprises a body consisting of a bottom 148 and side frames 149 preferably integral with the said bottom. A bracket 150 is rigidly united with the under side of the bottom of the chute preferably by being cast integral therewith and is fitted to the supporting shaft 130, the screws 151 being threaded through the said bracket 150 and being tightened to bear at their inner ends against flattened surfaces 152 formed in one side of the shaft 130. In this manner the body of the chute is rigidly connected with the supporting shaft so that when the shaft is partly rotated, the chute will be swung with a tilting movement in an upward or downward direction, depending upon the direction of rotation of the said shaft. The bracket 150 is located centrally between the bearing heads 129 which engage the said shaft 130 and which are carried at the upper ends of the piston rods 123 so that the parts are evenly balanced and stresses will be reduced to the minimum. The chute also includes a lining indicated in general by the numeral 153 and comprises a bottom 154 and sides 155. This lining is of sheet metal and the same is bolted or riveted in place, the bolts or rivets, indicated by the numeral 156, being preferably secured through the bottom of the lining and through the bottom 148 of the body of the chute. It will be understood that this lining receives the wear due to delivery of the material through the chute and that when the lining becomes worn it may be removed and replaced by a new one. In order that material discharged from the chute may be deflected outwardly so far as possible in a rearward direction so as to effectually clear the machine and thereby prevent discharge of material onto any working portion of the machine, the bottom of the lining 153 at the rear or discharge end of the chute is deflected upwardly to provide a discharge lip 157 which will deflect the material in the manner stated.

The side frames 149 of the body of the chute are provided with forward extensions 158 which project forwardly beyond the forward end of the bottom of the chute and also beyond the corresponding end of the lining 153. The chute as a whole, of course, operates between the upright guides 131 and through rotative movement of the supporting shaft 130 may be swung with a tilting movement from the position shown in Figs. 1, 2, 9, 10 and 11 to the dumping position shown in Figs. 3 and 8 and, under conditions to be presently described, even to the vertical position shown in Figs. 6 and 7 of the drawings.

The forward extensions 158 of the side frames 149 of the chute body are formed each with a longitudinally extending guide slot 159 providing spaced guides 160 which are formed in their opposing faces with longitudinally extending grooves 161 and which are bridged and connected at their outer ends by a yoke 162 removably secured in place. These extensions 158 of the side frames of the chute body support between them the shovel of the machine which will now be specifically described.

The shovel above referred to is indicated in general by the numeral 163 and the same comprises a bottom 164 and sides 165. The forward portion of the bottom of the shovel occupies a plane inclined at an obtuse angle to the plane of the rear portion of the said bottom and is indicated by the numeral 166. The working edge of the shovel, indicated in general by the numeral 167, is formed or provided with a plurality of teeth 168 of any desired number and spaced in any desired manner, these teeth not only adapting the working edge of the shovel to more readily enter the mass of material to be handled but also constituting means for breaking up or loosening the material so that a load thereof may be more readily taken up and accumulated by the shovel in its operation. In the illustrated embodiment of the invention these teeth are secured to the forward edge of the bottom portion 166 of the shovel and preferably in a manner to permit of their detachment in the event of breakage so that they may be replaced. In order that, when the shovel is given a side sweeping motion, it may be adapted to plow through the mass of material and take up a quantity thereof in substantially the same manner material is taken up in the blade of a hand shovel when the shovel is manually swung with a sweeping motion as is ordinarily done, the side walls of the shovel at its forward portion are provided each with a laterally projecting scoop blade, indicated by the numeral 169, the upper surface of this blade being rounded transversely along a line curving laterally and downwardly from the inner to the outer edge of the blade as indicated by the numeral 170. The outer lateral edges of this blade are relatively sharp so that as the shovel is given the sweeping motion above referred to, the blades will readily plow through the material, and, due to the contour of the upper surfaces of the blades, the material will be caused to ride over the blades and enter the shovel. Preferably the shovel at its rear portion is provided with a lining indicated in general by the numeral 171 and comprising a bottom 172 and sides 173, this lining corresponding in function to the lining 153 for the chute and, like the lining 153, being preferably removably secured within the said portion of the shovel so that it may be replaced when it becomes worn. At this point it may be remarked that when the shovel is swung up to assume a discharging position with relation to the chute, as for example as shown in Figs. 9 and 10 of the drawings, the rear portion of the lining 171 will seat within the forward portion of the lining 153 for the chute so that there will be no waste of material as it is discharged from the shovel into the chute. Preferably the body of the shovel is formed in front and rear sections indicated respectively by the numerals 163ª and 163ᵇ provided with an overlap joint or union 164′. The overlapped portions of the two sections are formed with front and rear lines or series of openings through which are fitted bolts 165′. By removing both sets of bolts, the front section may be shifted forwardly by reason of the provision of the overlap joint, and the bolts of one set replaced. In this manner, the nose of the shovel may be extended so as to permit of operation of the shovel on material located between and below the level of the treads of the rails upon which the truck of the machine travels.

The shovel 163 is supported for oscillatory and tilting motion by trunnions 174 which project from circular bosses 175′ formed upon the outer faces of the side walls 165 of the body of the shovel. These trunnions 174 fit rotatably in the sleeve like hubs 175 of anti-friction rollers 176 which are received within the guide slots 159 in the frame extensions 158 of the chute, the peripheries of the rollers seating in the grooves 161 in the spaced members of the respective guides, as clearly shown in Figs. 1 and 12 of the drawings.

In order to impart impulsive movement to the shovel so as to cause the same to dig into the material to be handled and to accumulate a load of such material, a novel type of impulse motor is provided and is connected with the shovel and I will first describe the construction and operation of the motor and then describe the manner in which it is connected with and acts upon the shovel.

The motor above referred to is most clearly shown in Figs. 15 to 21 inclusive and is indicated in general by the numeral 177.

The motor comprises a cylinder indicated by the numeral 178, this cylinder being secured to the under side of the bottom 148 of the body of the chute 147, as indicated by the numeral 179 and being also secured as at 180 to the under side of a cross member 181 which is secured at its ends to and extends between the inner ends of the extended portions 158 of the side frames of the chute. The cylinder 178 has its ends closed by heads suitably removably secured in place, one of said heads being indicated by the numeral 182 and the other in general by the numeral 183. The numeral 184 indicates a piston fitted to work within the cylinder 178 and provided with a piston rod 185 extending through and beyond the head 182 for connection with the shovel in the manner to be presently described. Substantially midway between its ends the cylinder 178 is provided with a vent port 186 which serves a purpose to be presently explained. The head 183 of the cylinder is provided with an inlet port 187 for the fluid under pressure, the said fluid being conducted to the port by a pipe 188 and the supply thereof being controlled by a valve the construction and operation of which will presently be pointed out. The head 183 is formed axially with a relatively large cylindrical bore 189 and the port 187 opens into this bore and is provided with a branch 190 which leads parallel to the axis of the head and opens into a recess 191 formed in the inner face of the head 183, the branch 190 thus being in communication with the interior of the cylinder 177. In one side and preferably diametrically opposite the port 187, the head 183 of the cylinder is formed with an exhaust port 192.

The valve of the motor indicated in general by the numeral 193 is a floating valve and the said valve comprises a cylindrical sleeve-like body 194 exteriorly of a diameter to slidably and yet snugly fit within the bore 189 of the head 183. The valve further comprises a flat circular head 195 formed at the inner end of the sleeve 194 and of a diameter to seat within the recess 191 in the inner face of the head 193. The sleeve body 194 of the valve 193 is formed with an exhaust port 196 so located as to communicate with the exhaust port 192 under conditions to be presently pointed out in the description of operation of the motor. In order to prevent rotation of the valve within the cylinder head 183, the head 195 of the valve is provided with guide pins 197 which slidably fit in guide sockets 198 formed longitudinally in the said head 193. Upon its face which is presented toward the cylinder head 183, the piston head 184 is formed with a boss 199 having a passage 200 formed therein. In addition to the rod 185, the piston is provided at the last mentioned side of its head 184 with a second rod indicated by the numeral 201 the inner end of which is concentric to the boss 199. This rod 201 extends through the bore 202 of the valve body 194 and is formed near its outer end, and at a point suitably spaced from the piston head 184, with an enlargement constituting a cylindrical head 203 snugly and yet slidably fitting within the bore 202 of the valve body. The end portion of the piston rod 201 is threaded as indicated by the numeral 204 and an abutment collar 205 is fitted onto this end of the rod and secured in place by a nut 206, the collar 205 being designed, in the operation of the motor, to strike against the outer end of the body of the valve 193 and being of a diameter less than the diameter of the bore 189 of the cylinder head 183.

Figs. 15 and 18 illustrate the piston and valve of the impulse motor in their initial positions and it will be observed that in this phase of operation of the motor the piston is at the full limit of its stroke in the direction of the cylinder head 183, the valve 193 being likewise at the limit of its movement in the corresponding direction. With the parts in this position, the exhaust port 196 in the valve 193 is in communication with the exhaust port 192 and the vent port 186 is uncovered. When the fluid under pressure is first admitted through the pipe 188, it will pass through the intake port 190 and acting against the face of the head 195 of the valve, will move the valve to about the position shown in Fig. 19 of the drawings. In this movement, the valve will carry with it the piston 184 and as the head of the valve clears the end of the recess 191, the fluid under pressure will act against the piston head moving the same substantially to the position shown in Fig. 20 of the drawings. As the piston head moves to this position the air trapped within the end of the cylinder at which the cylinder head 182 is located, will be suddenly compressed, the vent port 186 being closed immediately by the piston 184. Also as the piston moves to this position, the abutment collar 205 will strike the end of the body of the valve 193 and the valve will be carried along with the piston until it reaches about the position shown in the said Fig. 20. When the valve reaches this position its outer end will partly uncover the port 187 so that the fluid under pressure will bleed through the port to the atmosphere, thus relieving the pressure behind the piston and valve. The trapped air under pressure in the opposite end of the cylinder will then immediately act to cause a rebound of the piston in the direction of the cylinder head 183 and as the piston moves in this direction the air cushion formed between it and the head of the valve will cause the valve to move in a corresponding direction in spaced relation to the piston head so that eventually the parts will assume about the position shown in Fig. 21 of the drawings. In this position of the parts the head of the valve will be substantially seated within the recess 191 and there will be an exhaust of air from the space between the valve head and piston through the bore 202 of the valve and through the ports 196 and 192 in the valve body and cylinder head 183 respectively. The movement of the piston to the position shown in Fig. 21 will, of course, result in the port 186 being uncovered so that the pressure within the end of the cylinder which is closed by the head 182 will be relieved. The rebound of the piston will in all probability act to bring the parts to the initial position shown in Fig. 18 and, of course, as the piston head approaches the valve head in this continued movement, the air trapped in the space between the head and valve will be bled through the passage 200 into the bore 202 of the valve and out through the ports 196 and 192 even though the boss 199 strikes the head end of the valve.

In actual operation of the invention embodying an impulse motor constructed as above described and shown in Figs. 15 to 21 inclusive, I have found that although fluid under pressure is supplied to one end only of the motor, the piston will be rapidly reciprocated to impart the impulsive oscillatory digging and scooping motion to the shovel. In fact I have found that in the operation of the motor when disconnected from the shovel and the remainder of the machine, the piston will be reciprocated with great rapidity so long as a continuous supply of fluid under pressure, as for example compressed air, is delivered to the motor. I have also found in the actual operation of the machine that when the motor is working and the working edge of the shovel is brought into contact with the material to be handled so that resistance is offered to its oscillatory motion, the strokes of the shovel, while somewhat shortened, will be greatly increased in rapidity, and this I believe to be of benefit inasmuch as by the rapid action of the shovel upon the material, the material will more effectually be loosened up and the resistance sooner and more effectively overcome with consequent less wear upon the cutting edges of the shovel.

In order that the reciprocatory motion of the piston 184 may be transmitted to the shovel to impart to the latter the impulsive oscillatory motion heretofore referred to, the piston rod 185 is provided at its outer end with a yoke 207 which is pivotally connected as at 208 with a head 209 forming a knuckle slidably fitted upon a thrust rod 210. This rod is fixed at its ends in suitable bearings 211 and 212 upon the under side of the bottom of the shovel. By particular reference to Fig. 11 of the drawings it will be understood that when the impulse motor is in operation and the piston is being rapidly reciprocated, the shovel will be rapidly oscillated with a scooping or digging motion so that its working edge will dig into the material to be handled and loosen said material, the forward portion of the shovel impelling the material upwardly and rearwardly so that a load of the material will be accumulated within the shovel.

As previously described, the shovel is supported for oscillatory or swinging motion and normally, when at rest, or when being operated through the medium of the impulse motor to work into and accumulate a load of the material to be handled, it will assume about the position shown in Fig. 11 of the drawings or will move substantially within the limits indicated in dotted lines in Fig. 3 of the drawings. In these positions the shovel is, of course, not arranged to conveniently and properly discharge into the chute of the assemblage nor could it be caused to discharge its load if the assemblage were tilted or swung upwardly to discharging position. It is therefore desirable that means be provided operable to move the shovel upon its supporting trunnions to such position that it will be nearly in alignment with the chute. The shovel in this position is most clearly shown in Figs. 9 and 10 of the drawings and hereinafter both in the description which is to follow and in the claims, this position of the shovel will be referred to as discharging position. In this position of the shovel its lining 171 will nest within the forward end of the lining 153 of the chute as clearly shown in the said Figs. 9 and 10 and the rear portion of the bottom of the shovel will be approximately in the same plane as the bottom of the chute. The means provided for effecting this movement of the shovel will now be specifically described.

Slidably fitted in that end of the cylinder 177 which is closed by the head 182, is a piston 213 having a tubular rod 214 which fits through a stuffing box 215 upon the said head 182, the bore of the said rod 214 slidably receiving the piston rod 185 of the piston 184. A yoke, indicated in general by the numeral 216 is provided between its ends with a collar 217 into which is fitted the outer end of the piston rod 214 as clearly shown in Figs. 9, 10, 14, 15, 18, 19, 20, and 21 of the drawings, taper pins 218 being driven through the sides of the collar to secure the end of the piston rod in place. The yoke 216 is provided with arms 219 in turn provided at their ends with collars 220, which collars are fitted to the outer ends 223 of the spindles of anti-friction rollers 224 mounted for travel in respective ones of the guides 158. The inner ends of the spindles for these rollers are indicated by the numeral 225, and connected to them are links 226 which are likewise connected with the inner ends of the hubs 175 of the respective rollers 176.

As will presently be explained, the admission of fluid under pressure into the cylinder behind the piston 213 is controlled by a throttle valve and the fluid is conducted to the cylinder through a pipe 227 which opens through the cylinder head 182. The under side of each guide 158 is provided with a depending boss 228, and mounted in these bosses are the ends of a bridle rod 229. Loosely mounted at spaced points upon this rod are toggle links 230 which at their outer ends are bifurcated to provide spaced ears 231, the ears of each toggle link receiving between them a respective ear 232, the latter ears being secured in any suitable manner upon the under side of the bottom 164 of the shovel. Each of the ears 232 is formed with a slot 233, and pivot pins 234 are passed through the slots of the said ears and through apertures 235 formed in the ears 231 of the toggle links. When the shovel is being operated with an impulsive digging and scooping motion, as previously explained, the links 230 will rock upon the bridle rod 229, their pivots 234 moving in an arc concentric to the bridle rod. In this operation of the parts the pivot pins 234 will be located rearwardly of a line passing through the axis of the bridle rod and through the axes of the trunnions 174 upon which the shovel is hung, these links in no way interfering with the impulsive movement of the shovel and merely oscillating freely under the conditions stated. However, when, in the operation of the shovel, controlled by the manually operable throttle valve to be presently described, the piston 184 has first been brought to the position shown in Figs. 15 and 18 of the drawings and, next, air is admitted to the cylinder behind the piston 213 to move the same inwardly, the piston rod 185, in exerting an outward or forward thrust upon the thrust rod 210 will sharply swing or kick the shovel in an upward or forward direction, and through the inward or rearward pull of the piston rod 214 upon the yoke 216, the bearings for suspending the shovel will be pulled rearwardly in the guides 158 through the link connections 226. In this movement of the parts the toggle links 230 will assume approximately the position shown in Fig. 10 of the drawings in which position their pivots 234 will be located forwardly of a line passing through the axis of the bridle rod 229 and the axes of the trunnions 174 of the shovel. As the toggle links assume this position, their pivot pins will ride upwardly in the slots 233 in the ears 232 so that the end of these links will substantially bear against the attaching portions of the said ears 232 as shown in Fig. 10 of the drawings. Due to the change in position of the pivots for the toggle links from the rear to the forward side of a line passing through the axis of the bridle rod and the axes of the trunnions for the shovel, the links in the latter position, as shown in Fig. 10, will constitute in effect struts to firmly support and lock the shovel in its kicked up or discharging position, and as before stated, in this position of the shovel the rear portion of its lining nests within the forward end of the lining 153 of the chute so that when the shovel and chute assemblage is swung upwardly to dumping position, the load accumulated within the shovel will be discharged into the chute and dumped therefrom.

In order to limit the forward stroke of the piston rod 185 and thereby prevent binding of this rod with a consequent possibility of locking the parts, means is provided which will now be described. The numeral 236 indicates a yoke the arms of which are loosely pivotally connected as at 237 with the bridle rod 229 between the toggle links 230 and this yoke is provided at its intermediate portion with a pair of spaced ears 238 apertured as at 239 for the passage of a pivot pin 240, this pin passing also through an aperture 241 in an ear 242 formed on a sleeve 243 which is slidably mounted upon the thrust rod 210. As the shovel is swung upon its trunnions to discharging position, the thrust rod will slide through the sleeve 243 and, as in this movement of the shovel the thrust rod, at its forward portion, swings away from the bridle rod, the yoke 236 will swing upwardly and the sleeve 243 will travel backwardly upon the thrust rod 210 until it meets the knuckle 209 thus preventing further forward movement of the knuckle and, as stated, limiting the forward stroke of the piston.

Figs. 22 to 25 inclusive clearly illustrate the throttle valve provided for controlling the admission of fluid under pressure to the cylinder 177 and the cylinders 107, and this valve will now be specifically described. The valve, which is indicated in general by the numeral 244 comprises a casing consisting of a substantially cylindrical body 245 closed at its forward and rear ends by heads indicated respectively by the numerals 246 and 247, these heads being secured in place removably by bolts or other suitable fastening elements 248 and 249 respectively. The casing is mounted in any suitable manner preferably upon and at the rear of the cylinders 107 of the hoist. The body of the casing 245 is preferably interiorly cylindrical and fitted therein is a bushing or lining 250 which is exteriorly cylindrical and interiorly tapered the latter as indicated by the numeral 251, the taper being in the direction of the lower head 247 of the valve casing, and the said bushing or lining being clamped in place between the casing heads. The plug or body of the valve is indicated by the numeral 252 and the same is of tapered form so as to snugly fit within the said lining or bushing 250 as clearly shown in Fig. 24 of the drawings, a spring 253 being interposed between the forward or major end of the plug and the inner side of the head 246 to firmly seat the plug within the bushing in an air-tight manner. The stem of the valve is indicated in general by the numeral 254 and the said stem is rotatably fitted through an opening 255 formed axially in the head 247 of the valve casing and also rotatably fits through a bore 256 formed axially in the plug or valve body 252 although this movement is limited as will be presently explained. At its forward end the valve stem 254 is formed exteriorly with an enlargement 257 rotatably seating within a tubular extension 258 formed upon the outer side of the casing head 246. A nipple 259 is threaded into the said tubular extension and engages the enlarged end 257 of the valve stem, and a packing nut 260 is threaded onto the outer end of the nipple and secures the nipple end 261 of a pipe 262 for conducting the fluid under pressure from the fluid pressure tank 29, the fluid being conducted through the nipple 259 and through a duct 263 formed longitudinally in the valve stem 254. The said bore is provided with a lateral branch 264 designed to register with a radial port 265 formed in the valve body or plug 252. Immediately rearwardly of the branch 264 of the duct 263, the valve stem is formed with a circumferential groove 266 in which is seated a suitable packing element 267 designed to prevent leakage of the fluid under pressure past this point in the direction of the minor end of the valve plug or body. A pin 268 is driven diametrically through the valve stem 254 and one end of this pin is designed to move between and coact with spaced abutment elements 269 secured in the minor end of the valve plug 252 and located in a line chordal to the circle described by the said end of the plug, this end of the plug being recessed as indicated by the numeral 270 so as to accommodate the abutment elements 269 and the said pin 268. A pin 271 is also driven diametrically through the stem 254 immediately outwardly of the head 247 so as to assist in preventing longitudinal displacement of the valve stem. In order that the stem may be rotated so as to effect the desired results, a handle 272 is provided with a head 273 having an opening 274 which adapts the handle to be fitted onto the reduced rear end 275 of the valve stem 254, a set screw 276 being threaded through the head 273 and bearing against a flattened surface 277 formed on the said reduced end of the stem.

The valve body or plug 252 is formed in its forward portion concentric to its axis, with an exhaust chamber 278 and the said body or plug is also formed with a radial exhaust passage 279 in communication with the chamber 278 and opening through the circumferential surface of the said body. This exhaust passage at its outer end is adapted to be brought into registration with an exhaust port 280 formed in the bushing 250 and which exhaust port 280 is at all times in registration with an exhaust port 281 formed in the body 245 of the valve casing. The valve body is also formed with exhaust passages 282, 283 and 284 which are radial to its axis and open at their outer ends through the circumferential surface of the said body and at their inner ends are in communication with the exhaust chamber 278. The bushing 250 is also formed with ports 285, 286 and 287, respectively, at all times in registration respectively with ports 288, 289 and 290 formed in the wall of the body 245 of the valve casing. The pipe 188 heretofore referred to is provided for the purpose of supplying fluid under pressure to the impulse motor to actuate the shovel with an impulsive digging and scooping movement, is connected in communication with the port 288, and the pipe 227 which also leads to the cylinder of the motor and which conducts the fluid under pressure for actuating the piston 213, is connected in communication with the port 289. The numeral 291 indicates a pipe which leads from the port 290 to the port 112 for supplying air to the cylinders 107 of the hoist for the shovel and chute assemblage. The pipe 262 heretofore referred to leads from the compressed air tank 229. The operation of the valve just described will be fully explained in the description of operation of the machine as a whole.

When the machine is employed in mines, tunnels, or upon the surface, the truck wheels will ordinarily run on track rails laid for this purpose as heretofore explained. However, the machine is not limited to the uses just mentioned for it may be readily employed in house or box cars or in other building structures from which loose material is to be unloaded. For example in Fig. 8 of the drawings there is shown a box car as indicated by the numeral 292 within which the shoveling machine is positioned, the machine being designed to act upon the material in either end of the car and to discharge the material from its chute into a second chute 293 leading to the exterior of the car through the doorway thereof and supported in any suitable manner. When the machine is thus employed the truck wheels will ordinarily have straight treads so as to rest and travel directly upon the floor of the car and under these conditions it will no doubt be found advisable to employ chock blocks 294 connected by chains or other suitable flexible elements 295 with the body of the truck, the blocks being further more located as to be adapted to be disposed behind the forward wheels of the truck to prevent the truck receding from the material in the operation of the machine.

The operation of the machine is as follows:—It will first be assumed that the shovel and chute assemblage is in the lowered or working position shown in Figs. 1, 2 and 11 of the drawings and that the source of air supply has been coupled with the tank 29. The attendant will manipulate the throttle lever 39 to admit the air under pressure to the truck motor having previously manipulated the rack bar 52 so that the truck will be caused to travel in the direction of the material to be acted upon at the desired rate of speed, the movement of the truck being continued until the shovel has been brought to position in proper relation to the material to act upon the same when the shovel is operated. When the machine has been brought to position with the shovel in sufficiently close proximity to the material to be acted upon, it is either brought to rest by shutting off the truck motor, or the speed of travel of the truck is greatly reduced, depending upon the nature and condition of the material, that is to say, whether the material consists of relatively fine particles and is therefore relatively loose and easy to scoop up, or consists of relatively coarse particles or pieces and is therefore more or less difficult to scoop, or whether it is dry or wet. Thus with some kinds of material it will be found advisable to maintain the truck stationary while the shovel is digging and scooping the material and thus accumulating its load thereof; with other kinds of material it will be found advisable to slightly advance or withdraw the truck and consequently the entire machine, then set the shovel in operation, again slightly advance the machine, and repeat this intermittent advance and withdrawal of the machine and operation of the shovel until the shovel has accumulated its load; and with other kinds of material it will be found possible and advisable to continuously slowly advance the machine during the operation of the shovel. In fact the mode of operation of the machine as concerns the advancement thereof toward the material to be handled and the operation of the shovel in digging into and scooping up the material, will be determined largely by the nature and condition of the material. The operation of the shovel and the movement of the shovel and chute assemblage into and out of dumping position is controlled by the throttle valve shown in Figs. 22 to 25 inclusive and previously described, the valve body assuming initially the position shown in Fig. 23 of the drawings. In this position the exhaust passage 279 will register with the port 280 and therefore be in communication with the exhaust port 281, and likewise the passages or ducts 282, 283 and 284 will be in registration with the respective ports 285, 286 and 287 and in this position of the valve there will be no fluid under pressure in the cylinder of the impulse motor nor in the cylinders of the hoist. As before pointed out, the valve stem 254 is rotatable in the bore 256 of the valve and inasmuch as the throttle lever 272 will tend to assume by gravity a vertical position, the said valve stem will be normally held by the weight of this lever in such a position that its port 264 will be out of registration with the port 265. In order to set the shovel in operation, the throttle lever is swung to the left until the end of the pin 268 engages one of the abutment elements 269. This movement of the throttle lever will be imparted to the valve stem 254 as the lever is rigidly connected with the said stem and as a result of such movement of the stem, its port 264 will be brought into registration with the radial passage 265 in the valve body. There is, of course, a constant supply of air under pressure to the valve stem through the pipe 262 and thus the source of compressed air supply is connected with the passage 265 when the valve stem is rotated to bring its port 264 into registration with the inner end of this port. This movement of the valve stem is, of course, independent of the valve plug or body 252 but upon engagement of the end of the pin 268 with the said abutment element 269, the valve body or plug will be influenced by further movement of the throttle lever and may consequently be rotated to such position that its said passage 265 will register with the port 285 whereupon the fluid under pressure will be delivered through the pipe 188 to the impulse motor, setting the same in operation and imparting impulsive digging and scooping motion to the shovel in the manner heretofore described. Should it be desired to temporarily discontinue the operation of the shovel, it is only necessary for the attendant to release the throttle lever 272 whereupon the same will swing downwardly by gravity thus bringing the port 264 out of registration with the passage 265 and cutting off the supply of fluid under pressure to the cylinder of the impulse motor. The passage 265 will, however, remain in registration with the port 285 and consequently in communication with the port 288 and pipe 188 so that when it is desired to resume the operation of the shovel it is only necessary to swing the throttle lever upwardly a short distance to again bring the port 264 of the valve stem 254 into registration with the said passage 265. As previously pointed out, it is desirable to swing the shovel to discharging position with relation to the chute and to lock the shovel in its position while the shovel and chute assemblage is being elevated and lowered and this may be accomplished by further rotating the valve plug or body 252 through the medium of the lever 272 until the passage 265 registers with the port 283 and is consequently placed in communication with the port 289 and pipe 227. In this movement of the valve the port 285 will be closed and consequently the air in the impulse motor and pipe 188 will be trapped and the shovel will cease its impulsive movement. Upon registration of the passage 265 with the port 286, however, air will enter the cylinder of the impulse motor behind the piston 213. When the air is cut off from the pipe 188 and is trapped within the cylinder of the impulse motor behind the piston 184, the piston will be near the end of its outward stroke and consequently the shovel will be in a more or less elevated position, and when the fluid under pressure is admitted through the pipe 227 and acts upon the piston 213 to move the latter as stated above, the yoke 216 will be pulled rearwardly as shown in Figs. 9 and 10 of the drawings carrying with it the trunnions which support the shovel so that the shovel will have its rear end drawn rearwardly and it will be bodily further swung in an upward direction until it assumes substantially the position shown in the said figures, in which position it is nearly in alignment with the chute 153. At the same time the toggle links 230 will be so rocked that they will pass from a position at the rear of a line passing through the axes of the trunnions for the shovel and the axis of the bridle rod 229, to the forward side of said line and as a consequence the shovel, will be locked and supported in its discharging or kicked up position. In the foregoing operation the shovel has been first operated with an impulsive movement to dig into and scoop up a load of the material and then operated to assume a discharging position, this having been accomplished through the movement of the throttle valve to first bring the passage 265 into communication with the pipe 188 leading to the impulse motor and then to bring the said passage 265 into communication with the pipe 227 to supply compressed air to the cylinder of the motor behind the piston 213. With some kinds of material, however, the machine may be caused to function in a more direct manner. For example in handling a very loose material into a mass of which the shovel may be caused to enter by a mere direct forward travel of the machine, the impulsive operation of the shovel may be dispensed with and after the shovel has been caused to enter the mass of material to the required depth, the throttle valve may be rotated from the position shown in Fig. 23 immediately to position with its passage 265 registering with the port 286. While the passage 285 at its outer end passes the port 285 in this movement of the valve, communication is only momentarily established between the said passage 265 and the pipe 188 and in this momentary communication of these fluid pressure conducting mediums a sufficient volume of air under pressure will be admitted to the cylinder of the impulse motor behind the piston 184 to effect the initial kick up of the shovel, this movement and the locking of the shovel being completed upon registration of the passage 265 with the port 286.

After a load of the material has been accumulated in the shovel either through impulsive operation of the shovel or through the direct operation thereof last described, the shovel and chute assemblage may be tilted to dumping position by further swinging the throttle handle 272 so as to rotate the valve plug or body 252 to bring the passage 265 into registration with the port 287 and therefore into communication with the pipe 291. Upon moving the valve to this position, air under pressure will be admitted to the cylinders 107 of the hoisting mechanism shown in Fig. 29. As air under pressure is admitted into these cylinders the pistons will be caused to move upwardly as previously described until they assume approximately the position shown in the said figure, whereupon the air under pressure will by-pass through the passage 114 and ports 116 until the pressures are so apportioned between the upper and lower ends of the cylinders that pressure against the under sides of the pistons will be sufficient to support the weight of the shovel and chute assemblage as transmitted to the shaft 130, in addition to the weight of the load of material taken up by the shovel. Of course, in the upward movement of the pistons, the shovel and chute assemblage has been swung upwardly until it has reached approximately the position shown in Fig. 3 of the drawings whereupon the load will be discharged from the shovel into the chute and will pass by gravity down the chute and be discharged at the rear of the machine.

After the load has been discharged from the shovel and chute assemblage in the manner above described, the parts are all returned to their initial positions by swinging the throttle handle 272 to rotate the valve body 252 to the initial position shown in Fig. 23 of the drawings in which position all of the pipes 188, 227 and 291 will be placed into communication with the exhaust port 281 and consequently the fluid under pressure will be permitted to escape from both ends of the cylinder of the impulse motor as well as from the cylinders 107 of the hoist. In the instance of the hoist, the weight of the shovel and chute assemblage will of course be sufficient to cause the pistons to lower in the cylinders as the air escapes through the port 112 and its branches 113, this escape being gradual so that the lowering movement of the shovel and chute assemblage is cushioned as well as its upward movement, the former being accomplished through the cushion of air trapped in the upper ends of the cylinders 107 as the pistons 117 move upwardly in the cylinders. At this point it is to be noted that inasmuch as by a mere lowering of the throttle lever 272 the port 264 will be moved out of registration with the passage 265, the shovel and chute assemblage may be stopped at any point in its upward or downward swinging movement. Also it will be understood that during any cycle of operation of the shovel or the shovel and chute assemblage, the attendant must manually hold the lever 272 against dropping by gravity and therefore should he fail to properly attend to his work, no damage will in all probability be caused inasmuch as his release of the throttle handle or lever will result in an immediate cutting off of the air supply to the cylinder of the impulse motor or the cylinders 107 of the hoist as the case may be. Thus for example he cannot move the throttle lever to position to set the shovel in impulsive operation and then leave the machine unattended. Also should he meet with an accident disabling him so as to prevent him attending to the operation of the machine, his mere release of the throttle lever will serve to automatically cut off the supply of compressed air and thus effect the automatic stopping of the operation of the machine.

In the foregoing description of operation of the machine it has been assumed that the shovel is facing directly forwardly, but as previously explained, the structure illustrated in Figs. 26, 27 and 28 of the drawings provides means whereby the machine may be bodily swung laterally so as to correspondingly swing the shovel. Thus by manipulating the valve lever 91, movement of the piston 65 in the cylinder 64 may be effected so as to swing the turntable toward the right or toward the left as desired and thus correspondingly swing or move the shovel. Thus the shovel may be positioned to one side or the other of the front of the truck so that its field of operation is not restricted to the relatively narrow space immediately in front of the truck. If desired the shovel may be swung toward the right or toward the left and then operated with the impulsive movement or operated directly as above described. Also the shovel may be first swung to the right or to the left into working relation to the pile of material and then swung backwardly toward normal position and at the same time either operated with the impulsive movement before described or in the direct manner before described. By this mode of operation the shovel may be caused to side sweep through the material in a manner simulating that in which a hand shovel is usually manipulated when handling loose material in a pile. The valve 99 shown in Fig. 26 provides a means for greatly simplifying the operation of the shovel under some conditions. For example, if the shovel has been swung toward the right or toward the left and while in this position is either directly actuated by movement of the throttle valve from the position shown in Fig. 23 to the position with the passage 265 in communication with the pipe 227 or is first actuated with the impulsive movement which results when the said passage is brought into communication with the pipe 188 and is then subsequently kicked up by the passage being brought into communication with the pipe 227, the movement of the yoke 216 will result in one arm of this yoke striking the abutment head 105 upon the stem 104 of the valve 102 forcing the valve to open position and causing an automatic return of the piston 65 to the intermediate position shown in Fig. 26. This movement of the piston, as previously explained, effects an automatic return of the shovel and chute assemblage to intermediate or normal position. Thus if the shovel has been swung to the right or to the left, the mere operation of the throttle valve to move the shovel to discharging position with relation to the chute, will result in an automatic return of the shovel and chute assemblage to its initial position without the necessity of operating the valve lever 91. Also if desired the throttle valve may under these conditions be rotated so that the passage 265 will pass and momentarily register with the ports 285 and 286 thus effecting the movement of the shovel to discharging position, and the rotation of the valve may be continued until the passage has been brought into registration with the port 287 whereupon the hoisting means will be set in operation and as a result the shovel and chute assemblage will be swung upward to discharging position as it is at the same time swung laterally back to its initial or normal position.

It will be readily understood that the machine may be operated to advance toward the material to be handled or to withdraw from the material and thus the machine may be conveniently employed in cleaning up the surface on which the material is deposited so that if, after the majority of the material has been scooped up and discharged, there are small piles of the material lying about, the shovel and chute assemblage may be swung around and the machine advanced and withdrawn or moved backwardly so as to enable the assemblage to act successively upon the piles of material. Also it will not infrequently happen that a boulder or large lump of material will roll to position beneath the shovel in which event the machine will be moved backwardly to enable the shovel to clear the boulder or other obstruction and afterwards moved forwardly so as to scoop up the boulder or obstruction if the same is of a size to permit of its being handled by the shovel. Should a boulder or other obstruction roll to position beneath the shovel, the shovel will not pound on the obstruction for the reason that in this position of the shovel the piston 184 will be approximately in the position shown in Fig. 20 of the drawings and the air entering through the pipe 188 will be bled past the end of the floating valve 193. Thus damage to the shovel is obviated as also damage to the impulse motor of which the said piston constitutes a part. Furthermore, inasmuch as the machine may be readily advanced and withdrawn or moved backwardly, a number of fallen boulders or large lumps of material may be individually picked up by the shovel by running the machine backwardly and then advancing the same to force the nose of the shovel beneath the boulder or the like after which the throttle lever may be thrown to a position to move the shovel to discharging position as heretofore described, and the hoist then set in operation to tilt the shovel and chute assemblage to dumping position.

From the foregoing it will be evident that the machine is in many respects automatic in its operation and that it possesses a flexibility of operation such as adapts it to operate upon a pile of material to be handled, in practically any desired manner so that the attendant having determined the most effective manner in which the material can be handled, may control the operation of the machine accordingly. It will be understood furthermore that the shovel may be advanced to enter the material and may be caused to recede from the material without in any way interfering with the impulsive movement of the shovel.

In handling some kinds of material such for example as mud, the load accumulated by the shovel would not be readily discharged due to the fact that the movement of the shovel and chute assemblage to dumping position is gradual and effected without jar. In order, however, that the machine may be adapted to handle such material effectively, means is provided for abruptly stopping the shovel and chute assemblage in its movement to dumping position so as to suddenly flip the assemblage to dislodge the load of material. This means is clearly shown in Fig. 35 of the drawings in which figure the numeral 296 indicates the guides in which the anti-friction wheels upon the shaft 130 travel in the upward and downward movement of this shaft and the numeral 297 indicates the yoke which connects the upper ends of the spaced members of the guide. A buffer block 298 of rubber or other suitable material is disposed within the upper end of the guide between the upper ends of the spaced members thereof and within the concavity of the yoke 297, and straps or the like indicated by the numeral 299 are passed through slots 300 in this block and about the spaced members of the guide and about the yoke 297. It will be understood that these buffer blocks may be readily removed and as readily placed in position and thus an effective means is provided whereby the machine may be quickly adapted to operate upon wet and sticky material such as mud or clay when the occasion arises.

Under some conditions it may be found desirable to lengthen or shorten the throw of the shovel and chute assemblage to discharging position, and this may be accomplished by the means illustrated in Fig. 36 of the drawings. In this figure the numeral 301 indicates a guide corresponding to one of the guides 131 heretofore described, and this guide, instead of being formed with a single opening to receive a single dead spindle such as the spindle 144, is provided upon its rear side with a boss 302 having a vertical series of threaded openings 303 into which may be fitted interchangeably a spindle 304 having mounted upon it a fulcrum wheel 305 corresponding to the wheel 145. By this means the wheel 305 may be mounted at various elevations upon the guide 301. In order that the corresponding lever arms 139 may be adjusted so as to coact with the wheels 305 in their different positions of adjustment, the shaft upon which these arms are mounted and which shaft is indicated in the said figure by the numeral 306, is formed with a keyway 307 extending longitudinally thereof. One of the lever arms is indicated by the numeral 308 and corresponds to the lever arms 139 except that instead of being connected with the shaft 306 by a break pin such as the pin 142 shown in Fig. 13 and heretofore described, the wall of the shaft receiving opening in the arm 308 is formed with keyways 309 corresponding in number with the number of openings 303 in the boss 302. A key 310 is adapted to be fitted into the keyway 307 and to occupy any one of the keyways 309, and in this manner the lever arms may be secured upon the respective ends of the shaft to extend at suitable angles to engage their respective wheels 305 in the several positions of adjustment of the said wheels. Of course, if any undue stress is placed upon the lever arms the pins 310 will be sheared so as to relieve the parts.

Having thus described the invention, what is claimed as new is:

1. In a shoveling machine, a chute, a shovel supported for oscillatory movement with relation to the receiving end of the chute and having its entering portion located, in the loading position of the shovel, below the plane of the bottom of the chute, and fluid-pressure means including a piston coacting directly with the shovel to operate the same with an oscillatory scooping movement independently of the chute to accumulate a load of the material to be handled.

2. In a shoveling machine, a chute, a shovel supported for oscillatory movement with relation to the receiving end of the chute and with its entering portion located, in the loading position of the shovel, below the plane of the bottom of the chute, fluid-pressure means including a piston coacting directly with the shovel to operate the same with an oscillatory scooping movement independently of the chute to accumulate a load of the material to be handled, the fluid-pressure means being operable to move the shovel to substantially aligned position with relation to the chute, and means operable to move the chute and shovel to position to discharge the accumulated load from the shovel through the chute.

3. In a shoveling machine, a shovel and chute assemblage, means for operating the shovel independently of the chute to accumulate a load of the material to be handled, means for operating the assemblage to discharge the accumulated load from the shovel through the chute, and controlling means common to the shovel operating and assemblage operating means.

4. In a shoveling machine, a shovel and chute assemblage in which the shovel is movable with relation to the chute, and a fluid pressure motor carried beneath the chute and in rear of the shovel and having a piston coacting directly with the shovel to operate the same to accumulate a load of the material to be handled.

5. In a shoveling machine, a shovel and chute assemblage in which the shovel is movable with relation to the chute, fluid pressure means including a piston coacting directly with the shovel to operate the same independently of the chute to accumulate a load of the material to be handled, means for bodily elevating the assemblage and for tilting the same to discharge the accumulated load from the shovel through the chute, and a controlling means for the fluid pressure means and the elevating means common to the two and controllable to selectively operate the said means.

6. In a shoveling machine, a shovel and chute assemblage in which the shovel is mounted for oscillatory movement with relation to the receiving end of the chute, fluid pressure means for operating the shovel with an oscillatory scooping movement to accumulate a load of the material to be handled, fluid pressure means for operating the assemblage to discharge the accumulated load from the shovel through the chute, and controlling means common to both of said fluid pressure means.

7. In a shoveling machine, a shovel and chute assemblage in which the shovel is movable with relation to the chute, fluid pressure means including a piston coacting directly with the shovel to operate the same independently of the chute to accumulate a load of the material to be handled, fluid pressure means for moving the shovel to discharging position with relation to the chute, fluid pressure means for bodily elevating the assemblage and for tilting the same to discharge the accumulated load from the shovel through the chute, and controlling means common to all of the three last-mentioned means and operable to selectively control the operation of the same.

8. In a shoveling machine, a shovel and chute assemblage in which the shovel is movable with relation to the chute, fluid pressure means including a piston coacting directly with the shovel to operate the same independently of the chute to accumulate a load of the material to be handled, fluid pressure means for moving the shovel to discharging position with relation to the chute, fluid pressure means for bodily elevating the assemblage and for tilting the same to discharge the accumulated load from the shovel through the chute, controlling means common to the three first-mentioned means and operable to selectively control the operation thereof, and means for laterally swinging the assemblage independently of the operation of any of the preceding means.

9. In a shoveling machine, a shovel, and a high fluid-pressure motor coacting directly with the shovel to impart to the shovel successive impulsive scooping movements to cause the same to jig into and accumulate a load of the material to be handled.

10. In a shoveling machine, a shovel and chute assemblage in which the shovel is movable independently of the chute, a high speed fluid-pressure motor coacting directly with the shovel to impart to the shovel successive impulsive scooping movements to cause the same to jig into and accumulate a load of the material to be handled, the assemblage being movable as a unit, and means for operating the assemblage to effect discharge of the accumulated load from the shovel through the chute.

11. In a shoveling machine, a shovel supported for oscillation, and a high speed fluid-pressure motor having a piston coacting directly with the shovel to impart thereto successive impulsive movements about its center of oscillation to cause the shovel to jig into and accumulate a load of the material to be handled.

12. In a shoveling machine, a shovel supported for oscillation, and a high speed fluid pressure motor having a reciprocating piston coacting with the shovel at its rear side and operable to impart to the shovel successive impulsive movements about its center of oscillation to cause the shovel to jig into and accumulate a load of the material to be handled.

13. In a shoveling machine, a shovel and chute assemblage in which the shovel is suspended for oscillation with relation to the receiving end of the chute, a high speed fluid-pressure motor including a main piston coacting directly with the shovel to impart, in the operation of the motor, successive impulsive scooping movements to the shovel to cause the same to jig into and accumulate a load of the material to be handled, and a secondary piston in combination with the motor and operatively connected with the shovel and operable, in conjunction with the first-mentioned piston, to impart to the shovel a positive movement to bring the same into discharging position with relation to the chute.

14. In a shoveling machine, a shovel and chute assemblage in which the shovel is suspended for oscillation with relation to the receiving end of the chute, a high speed fluid-pressure motor including a main piston coacting directly with the shovel to impart, in the operation of the motor, successive impulsive scooping movements to the shovel to cause the same to jig into and accumulate a load of the material to be handled, a secondary piston in combination with the motor and operatively connected with the shovel and operable, in conjunction with the first-mentioned piston, to impart to the shovel a positive movement to bring the same into discharging position with relation to the chute, and means for operating the assemblage to tilt the same as a unit and thereby discharge the accumulated load from the shovel through the chute.

15. In a shoveling machine, a shovel and chute assemblage in which the shovel is supported for oscillation with relation to the chute, a fluid pressure motor having a reciprocating piston coacting with the shovel to impart thereto successive impulsive movements about its center of oscillation to cause the shovel to jig into and accumulate a load of the material to be handled, and a supplemental piston associated with the fluid pressure motor and operating in conjunction with the shovel and with the first-mentioned piston of the fluid pressure motor to effect movement of the shovel to discharging position with relation to the chute.

16. In a shoveling machine, a shovel and chute assemblage in which the shovel is supported for oscillation with relation to the chute, fluid pressure means operable to impart to the shovel successive impulsive scooping movements about its center of oscillation to cause the same to jig into and accumulate a load of the material to be handled, fluid pressure means for moving the shovel to discharging position with relation to the chute, and controlling means common to the two first-mentioned means for selectively rendering the same active.

17. In a shoveling machine, a shovel and chute assemblage, the shovel being suspended for oscillation with relation to the receiving end of the chute, fluid pressure means coacting directly with the shovel to impart to the shovel successive impulsive scooping movements about its center of oscillation to cause the same to jig into and accumulate a load of the material to be handled, fluid pressure means in combination with the first-mentioned means for positively moving the shovel to discharging position with relation to the chute, and fluid pressure means for elevating and tilting the assemblage to position to discharge the accumulated load from the shovel through the chute.

18. In a shoveling machine, a shovel and chute assemblage, the shovel being suspended for oscillation out of alignment with the chute and for upward swinging movement into position substantially in alignment with the chute, fluid pressure means for oscillating the shovel to impart impulsive scooping movement thereto, fluid pressure means for swinging the shovel to discharging position with relation to the chute, controlling means common to both of said fluid pressure means operable to selectively render the same active, and means for tilting the assemblage to discharge the accumulated load from the shovel through the chute.

19. In a shoveling machine, a shovel mounted for oscillatory movement, an impulse motor mounted at the rear of the shovel and including a piston, a thrust rod mounted upon the rear side of the shovel, and a knuckle slidably mounted upon the said rod and pivotally connected with the piston.

20. In a shoveling machine, a chute, a shovel mounted for oscillatory movement at one end of the chute, an impulse motor mounted upon the under side of the chute and including a power transmitting element, a thrust rod mounted upon the underside of the shovel, a knuckle slidably mounted upon the said rod, and pivotal connection between the knuckle and the said element.

21. In a shoveling machine, a chute frame mounted for tilting movement, a lining in the frame, a shovel mounted for oscillatory movement in the forward portion of the frame, the shovel having a rearward extension arranged to nest within the lining of the chute when the shovel is swung upwardly to discharging position with relation to the chute, means for oscillating the shovel to impart impulsive scooping movement thereto, and means for swinging the shovel to discharging position.

22. In a shoveling machine, a chute comprising a frame and a chute proper arranged therein, the frame having forwardly extending guides, a shovel having journals seating in the guides and thereby supported for oscillation, and means mounted between the guides at the underside of the chute and connected with the rear side of the shovel for imparting oscillatory motion to the latter.

23. In a shoveling machine, a shovel mounted for oscillatory movement, a motor for operating the shovel including a piston rod, a thrust rod upon the shovel, means pivotally and slidably connecting the piston rod with the thrust rod, and means upon the thrust rod for limiting the stroke of the piston in one direction.

24. In a shoveling machine, a shovel mounted for oscillatory movement, a motor for operating the shovel including a piston rod, a thrust rod upon the shovel, means pivotally and slidably connecting the piston rod with the thrust rod, an element mounted to rock about a fixed center, and an abutment slidably mounted upon the thrust rod and pivotally connected with the said member and arranged to coact with the last mentioned means to limit the sliding movement of the piston in one direction.

25. In a shoveling machine, a chute, a shovel supported for oscillation in juxtaposition to the chute, means for imparting impulsive scooping motion to the shovel, means for swinging the shovel to discharging position with relation to the chute, and means for locking the shovel in said position.

26. In a shoveling machine, a chute, a shovel supported for oscillatory motion in juxtaposition to the chute, means for imparting impulsive oscillatory scooping motion to the shovel, means for moving the shovel to discharging position with relation to the chute, and toggle means coacting with the shovel to lock the same in the latter position.

27. In a shoveling machine, a chute, a shovel mounted for oscillatory movement in juxtaposition to the chute, means for imparting impulsive oscillatory scooping motion to the shovel, means for moving the shovel to discharging position with relation to the chute, a relatively fixed pivot element, and a toggle link mounted thereon and having loose pivotal connection with the shovel and constituting means for locking the shovel in its said discharging position.

28. In a shoveling machine, a chute, a shovel supported for oscillatory motion in juxtaposition to the chute, an impulse motor including a reciprocatory transmitting element pivotally and slidably connected with the shovel to impart impulsive oscillatory scooping motion thereto, means for moving the shovel to discharging position with relation to the chute, a bridle rod, and toggle links mounted upon the bridle rod at the opposite sides of the power transmitting element of the motor and pivotally connected with the said shovel and constituting means for holding the shovel in its discharging position.

29. In a shoveling machine, a chute, a shovel supported for oscillatory motion in juxtaposition to the chute, means for imparting impulsive oscillatory scooping motion to the shovel, means for moving the shovel to discharging position with relation to the chute, a fixed bridle rod extending adjacent the shovel, toggle links pivotally supported by the rod, and pivotal pin and slot connection between the toggle links and the shovel.

30. In a shoveling machine, a chute, a shovel mounted for oscillatory movement in juxtaposition to the chute, a thrust rod mounted upon the shovel, an impulse motor having a power transmitting element slidably connected with the said rod whereby in the reciprocation of the element impulsive oscillatory scooping motion will be imparted to the shovel, means for moving the shovel to discharging position with relation to the chute, a bridle rod, a toggle link mounted upon the bridle rod and connected with the shovel, a rocking member upon the bridle rod, an abutment element slidably mounted upon the thrust rod and arranged to cooperate with the connection for the power transmitting element of the motor to limit the stroke thereof, and pivotal connection between the rocking element and said abutment element.

31. In a shoveling machine, a chute, a shovel having journals rotatably and slidably mounted, means for imparting impulsive oscillatory scooping motion to the shovel, the said means in one phase of its operation acting to swing the shovel upwardly in a direction toward discharging position with relation to the chute, and means for shifting the journals for the shovel to complete said movement of the shovel.

32. In a shoveling machine, a chute, a shovel having journals rotatably and slidably mounted, means for imparting impulsive oscillatory scooping motion to the shovel, the said means in one phase of its operation acting to swing the shovel upwardly in a direction toward discharging position with relation to the chute, means for shifting the journals for the shovel to complete said movement of the shovel, and means for locking the shovel in said position.

33. In a shoveling machine, a chute, a shovel having journals rotatably and slidably mounted, means for imparting impulsive oscillatory scooping motion to the shovel, the said means in one phase of its operation acting to swing the shovel upwardly in a direction toward discharging position with relation to the chute, means for shifting the journals for the shovel to complete said movement of the shovel, and a toggle link having a fixed pivot and having pivotal connection with the said shovel, the pivot points of the toggle being so located that in the movement of the shovel to discharging position, the pivotal connection between the link and the shovel will pass from one side to the other of a line extending between the fixed pivot for the toggle and the journal for the shovel.

34. In a shoveling machine, a chute, a shovel having journals rotatably and slidably mounted, means for imparting impulsive oscillatory scooping motion to the shovel, the said means in one phase of its operation acting to swing the shovel upwardly in a direction toward discharging position with relation to the chute, means for shifting the journals for the shovel to complete said movement of the shovel, a bridle rod stationary with relation to the chute, and toggle links pivotally supported by the said bridle rod and having pivotal connection with the shovel, the said pivotal connection of the toggle and the axis of the bridle rod being so located with respect to the axis of the journal for the shovel that in the movement of the shovel to discharging position with relation to the chute, the pivotal connection between the toggle and the shovel will pass from one side to the other of a line extending through the axis of the bridle rod and the axis of the journal, whereby the toggle will perform the function of a strut to hold the shovel in said position.

35. In a shoveling machine, a chute, guides located at opposite sides of the forward end of the chute, a shovel, means shiftable in the guides journaling the shovel for oscillatory motion, a yoke having elements movable in the guides, means connecting the journaling means and the said elements of the yoke whereby when the yoke is moved rearwardly the journaling means for the shovel will be correspondingly moved, means for so moving the yoke, and means for imparting impulsive oscillatory scooping motion to the shovel.

36. In a shoveling machine, a chute, guides located at opposite sides of the forward end of the chute, a shovel, means shiftable in the guides journaling the shovel for oscillatory motion, a yoke having elements movable in the guides, means connecting the journaling means and the said elements of the yoke whereby when the yoke is moved rearwardly the journaling means for the shovel will be correspondingly moved, means for so moving the yoke, means for imparting impulsive oscillatory scooping motion to the shovel, the last mentioned means, in one phase of its operation, acting to swing the shovel in a direction toward discharging position with relation to the chute, and the movement of the yoke completing said movement of the shovel, and means for holding the shovel in such position.

37. In a shoveling machine, a shovel supported for oscillatory scooping movement and for movement to discharging position, a fluid pressure operated impulse motor including a cylinder and a piston working in the cylinder, operative connection between the piston and the shovel to impart impulsive oscillatory scooping movement to the shovel, a second piston in the cylinder of the motor, operative connection between the last mentioned piston and the shovel to influence the movement of the shovel to and to hold the same in discharging position, and means for controlling the supply of fluid under pressure to the said cylinder to selectively operate the pistons.

38. In a shoveling machine, a chute, a shovel supported for oscillatory scooping movement and for movement to discharging position with relation to the chute, a fluid pressure operated impulse motor including a cylinder, a piston working in one end of the cylinder, operative connection between the piston and the shovel to impart impulsive oscillatory scooping movement to the shovel, means for admitting fluid under pressure to the said end of the cylinder to actuate the said piston, a second piston in the other end of the cylinder of the motor, means for admitting fluid under pressure to the said end of the cylinder to actuate the said piston, operative connection between the last mentioned piston and the shovel to influence the movement of the shovel to and to hold the same in discharging position, and means for selectively controlling the fluid pressure admitting means.

39. In a shoveling machine, a chute, guides located at opposite sides of the forward end of the chute, a shovel, means shiftable in the guides journaled in the shovel for oscillatory motion, a member having elements movable in the guides, means connecting the journaling means and the said elements of the said member whereby when the member is moved rearwardly the journaling means for the shovel will be correspondingly moved, a fluid pressure impulse motor including a cylinder and a piston working in one end of the cylinder, means for admitting fluid under pressure to the said end of the cylinder to actuate the piston, operative connection between the piston and the shovel to impart impulsive oscillatory scooping motion to the shovel, a piston in the other end of the cylinder, operative connection between the piston and the said member, and means for admitting fluid under pressure to the last mentioned end of the cylinder behind the last mentioned piston.

40. In a shoveling machine, a chute, guides located at opposite sides of the forward end of the chute, a shovel, means shiftable in the guides journaling the shovel for oscillatory motion, a member having elements movable in the guides, means connecting the journaling means and the said elements of the said member whereby when the member is moved rearwardly the journaling means for the shovel will be correspondingly moved, a fluid pressure impulse motor including a cylinder and a piston working in one end of the cylinder, means for admitting fluid under pressure to the said end of the cylinder to actuate the piston, operative connection between the piston and the shovel to impart impulsive oscillatory scooping motion to the shovel, a piston in the other end of the cylinder, operative connection between the piston and the said member, means for admitting fluid under pressure to the last mentioned end of the cylinder behind the last mentioned piston, and means for selectively controlling the said fluid pressure admitting means.

41. In a shoveling machine, a rotatable shaft guided for up and down movement, means for elevating the shaft, a shovel and chute assemblage supported by the shaft and fixed for turning movement therewith, and means for imparting rotative movement to the shaft in its upward movement whereby to tilt the assemblage to discharging position.

42. In a shoveling machine, a rotatable shaft guided for up and down movement, means for elevating the shaft, a shovel and chute assemblage supported by the shaft, and fixed for turning movement therewith, a lever element fixed with relation to the shaft, and a fulcrum element in the path of movement of the lever element for coaction therewith to rotate the shaft in its upward movement and thereby tilt the assemblage to discharging position.

43. In a shoveling machine, a rotatable shaft guided for up and down movement, means for elevating the shaft, a shovel and chute assemblage supported by the shaft and fixed for turning movement therewith, a lever arm fixed with relation to the shaft, and a fulcrum wheel arranged in the path of movement of the lever arm with the shaft and to coact with said arm whereby to tilt the assemblage to discharging position as the shaft is elevated.

44. In a shoveling machine, a rotatable shaft guided for up and down movement, means for elevating the shaft, a shovel and chute assemblage supported by the shaft and fixed for turning movement therewith, a lever arm fitted to the shaft, break connection between the lever arm and shaft, and a fulcrumed element arranged in the path of movement of the lever arm when the shaft is being elevated and to coact therewith to cause rotation of the shaft to effect tilting of the assemblage to discharging position.

45. In a shoveling machine, a rotatable shaft guided for up and down movement, means for elevating the shaft, a shovel and chute assemblage supported by the shaft and fixed for turning movement therewith, a lever element adjustably fixed with relation to the shaft, and an adjustably mounted relatively fixed fulcrum element arranged in the path of movement of the lever arm when the shaft is being elevated and to coact with the said lever arm whereby to impart rotary motion to the shaft to effect tilting of the assemblage to discharging position.

46. In a shoveling machine, a shaft guided for up and down movement, a shovel and chute assemblage supported by the shaft to be elevated thereby, and means for elevating the shaft comprising a cylinder, a piston working in the cylinder and having a rod connected with the shaft, and means for admitting air to the cylinder beneath the piston, the cylinder being provided in its wall with a by-pass for conducting the fluid under pressure to the upper side of the piston when the piston is at a predetermined point in its upward movement in the cylinder.

47. In a shoveling machine, a shaft guided for up and down movement, a shovel and chute assemblage supported by the shaft, and means for elevating the shaft, the said means comprising companion cylinders, pistons working in the cylinders and having rods connected with the shaft, means common to both cylinders for admitting fluid under pressure thereto beneath the respective pistons, and a by-pass common to the two cylinders arranged to establish communication between the upper and lower ends of each cylinder when the respective piston is at a predetermined point in its upward movement therein.

48. In a shoveling machine, a rotatable shaft guided for up and down movement, means for elevating the shaft, a shovel and chute assemblage supported by the shaft and fixed for turning movement therewith, means for effecting rotation of the shaft in its upward movement whereby to swing the assemblage with a tilting movement to discharging position, and a buffer element arranged in the path of upward movement of the shaft.

49. In a shoveling machine, a rotatable shaft guided for up and down movement, means for elevating the shaft, a shovel and chute assemblage supported by the shaft and fixed for turning movement therewith, a relatively fixed fulcrum, a lever arm fixed with relation to the shaft and coacting with the fulcrum in the upward movement of the shaft whereby to impart rotary motion to the said shaft in its said upward movement, the said shaft being rotatable to position with the lever arm projecting downwardly, and a rest for the lower end of the arm in said position.

50. In a shoveling machine, a rotatable shaft guided for up and down movement, means for elevating the shaft, a shovel and chute assemblage supported by the shaft and fixed for turning movement therewith, a relatively fixed fulcrum, a lever arm fixed with relation to the shaft and coacting with the fulcrum in the upward movement of the shaft whereby to impart rotary motion to the said shaft in its said upward movement, the said shaft being rotatable to position with the lever arm projecting downwardly, a rest for the lower end of the arm in said position, and means upon the support for coaction with the said end of the lever arm to prevent displacement of the arm when in said position.

51. In a shoveling machine, a turntable, a shovel and chute assemblage mounted thereon, means for operating the shovel to accumulate a load of the material to be handled, means for moving the shovel to discharging position with relation to the chute, means for tilting the assemblage to position to discharge the load from the shovel through the chute, means operable to turn the turntable from and to intermediate position, and means operating automatically upon operation of the second mentioned means to effect operation of the last mentioned means to return the turntable to intermediate position if the same is not, at such time, in said intermediate position.

52. In a shoveling machine, a turntable, a shovel and chute assemblage mounted thereon, means for operating the shovel to accumulate a load of the material to be handled, means for moving the shovel to discharging position with relation to the chute, means for tilting the assemblage to position to discharge the load from the shovel through the chute, means operable to turn the turntable from and to intermediate position, and means automatically operated through operation of the second mentioned means to effect operation of the last mentioned means to return the turntable to intermediate position if the same is not, at such time, in said intermediate position.

53. In a shoveling machine, a turntable, a shovel and chute assemblage mounted thereon, means for operating the shovel to accumulate a load of the material to be handled, means for moving the shovel to discharging position with relation to the chute, means for tilting the assemblage to position to discharge the load from the shovel through the chute, a fluid pressure cylinder, a piston working therein and having operative connection with the turntable to swing the same upon movement of the piston in the cylinder, means for controlling the admission of fluid under pressure to the cylinder at the opposite sides of the piston to effect the movement of the latter, and means operating automatically, upon operation of the second mentioned means, to vent that end of the cylinder from which the piston is the more remote, to effect return of the piston to intermediate position to correspondingly move the turntable, if the latter and said piston are not, at such time, in intermediate position.

54. In a shoveling machine, a turntable, a shovel and chute assemblage mounted thereon, means for operating the shovel to accumulate a load of the material to be handled, means for moving the shovel to discharging position with relation to the chute, means for tilting the assemblage to position to discharge the load from the shovel through the chute, a fluid pressure cylinder, a piston working therein and having operative connection with the turntable to swing the same upon movement of the piston in the cylinder, means for controlling the admission of fluid under pressure to the cylinder at the opposite sides of the piston to effect the movement of the latter, the said cylinder having a vent closed by the piston when the latter is in intermediate position and uncovered when the piston is in other than intermediate position, a relief valve normally preventing the escape of fluid under pressure from the cylinder through said vent, and means for automatically opening said valve upon operation of the second mentioned means.

55. In a shoveling machine, a turntable, a shovel and chute assemblage mounted thereon, means for operating the shovel to accumulate a load of the material to be handled, means for moving the shovel to discharging position with relation to the chute, means for tilting the assemblage to position to discharge the load from the shovel through the chute, a fluid pressure cylinder, a piston working therein and having operative connection with the turntable to swing the same upon movement of the piston in the cylinder, means for controlling the admission of fluid under pressure to the cylinder at the opposite sides of the piston to effect the movement of the latter, the cylinder having a vent port closed by the piston when the piston is in intermediate position and uncovered when the piston is in other than intermediate position, a normally closed relief valve in communication with the said vent port and normally preventing the escape of fluid under pressure from the cylinder through said port, and an operating element for the valve movable through operation of the second mentioned means to open the said valve.

56. In a shoveling machine, a turntable, a shovel and chute assemblage mounted thereon, means for operating the shovel to accumulate a load of the material to be handled, means for moving the shovel to discharging position with relation to the chute, means for tilting the assemblage to position to discharge the load from the shovel through the chute, a fluid pressure cylinder, a piston working therein and having operative connection with the turntable to swing the same upon movement of the piston in the cylinder, means for controlling the admission of fluid under pressure to the cylinder at the opposite sides of the piston to effect the movement of the latter, the cylinder having a vent port closed by the piston when the piston is in intermediate position and uncovered when the piston is in other than intermediate position, a relief valve including a casing having a valve seat, a valve within the casing, means yieldably holding the valve to its seat, means establishing communication between the vent port and the casing behind the valve, the casing having a vent at the other side of the valve, and an actuating element for the valve positioned in the path of movement of an element of the second mentioned means whereby upon operation of the second mentioned means the valve will be automatically moved to open position to effect return of the piston and turntable to intermediate position.

57. In a shoveling machine, a shovel supported for oscillation, and means for imparting to the shovel successive impulsive scooping movements to cause the same to jig into and accumulate a load of the material to be handled, the said means comprising a cylinder, a piston working in the cylinder and operatively connected with the shovel, and means for automatically operating the piston through the admission of fluid under pressure to the cylinder at one side only of the said piston.

58. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means for admitting fluid under pressure to the cylinder at one side only of the piston, means for venting the fluid trapped in the cylinder at the other side of the piston, and automatic means for controlling the admission of fluid under pressure to the cylinder.

59. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means for intermittently admitting and exhausting fluid under pressure to and from the cylinder at one side only of the piston, and means for effecting a rebound of the piston acting against the opposite side thereof.

60. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means providing for rebound of the piston when moved in one direction and acting against one side of the piston, and means for intermittently supplying and exhausting fluid under pressure to and from the cylinder at the other side of the piston.

61. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means providing for rebound of the piston when moving in one direction and acting against one side of the piston, and means for intermittently applying force to the piston at its other side.

62. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means providing for the trapping of air in the cylinder at one side of the piston to be compressed by the movement thereof and providing for relief of the trapped air, and means providing for the intermittent application of force to the other side of the piston.

63. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means providing for the trapping of air in the cylinder at one side of the piston to be compressed by the movement thereof and providing for relief of the trapped air upon rebound of the piston as a result of said trapping and compression, and means for automatically intermittently alternately admitting and exhausting air under pressure to and from the cylinder to the other side of the piston.

64. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust at one side of the piston, and means for automatically intermittently alternately admitting and exhausting fluid under pressure to and from the cylinder at the other side of the piston.

65. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust at one side of the piston located to be controlled by the piston in its movement in one direction, and means for automatically intermittently alternately admitting and exhausting fluid under pressure to and from the cylinder at the other side of the piston.

66. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means for supplying fluid under pressure to the cylinder at one side of the piston, the cylinder being provided with an exhaust at the other side of the piston and being also provided with an exhaust at the first-mentioned side of the piston, and means for automatically successively admitting fluid under pressure to the cylinder, closing the first-mentioned exhaust, and opening the second-mentioned exhaust.

67. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, means for supplying fluid under pressure to the cylinder at one side of the piston, the cylinder being provided with an exhaust at the other side of the piston and being also provided with an exhaust at the first-mentioned side of the piston, and means for automatically successively admitting the fluid under pressure, closing the first-mentioned exhaust, venting the fluid pressure inlet, and opening the second-mentioned exhaust.

68. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust at one side of the piston and being provided also with an exhaust at the other side of the piston, means for admitting fluid under pressure to the cylinder at the last-mentioned side of the piston, and means operating automatically in consonance with the movement of the piston to successively move the piston to position closing the first-mentioned exhaust to vent the fluid pressure inlet, and to open the last-mentioned exhaust.

69. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust port located at one side of the piston to be closed by the piston in the movement of the latter in one direction, the cylinder having an inlet for fluid under pressure at the opposite side of the piston and being provided also with an exhaust at the last-mentioned side of the piston, and a valve for controlling the inlet and the last-mentioned exhaust, said valve operating automatically in consonance with the movement of the piston.

70. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust port located at one side of the piston to be closed by the piston in the movement of the latter in one direction, the cylinder having an inlet for fluid under pressure at the opposite side of the piston and being provided also with an exhaust at the last-mentioned side of the piston, and a valve for controlling the inlet and the last-mentioned exhaust operating automatically in consonance with the movement of the piston, the movement of the valve in one direction being successively influenced by the inlet of fluid under pressure and by the piston and being influenced in its movement in the opposite direction by the cushioning fluid under pressure between the piston and one end of the valve.

71. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust at one side of the piston, a valve slidably fitting the stem of the piston and having a bore provided with an exhaust opening, the said stem of the piston being provided with means for closing said opening in one relative position of the parts, the said cylinder having an exhaust in the path of movement of the valve and the said exhaust in the valve being located to be brought into and out of communication with the last-mentioned exhaust from the cylinder through movement of the valve, and means for admitting fluid under pressure to the cylinder at the other side of the piston.

72. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust at one side of the piston, a valve slidably fitting the stem of the piston and having a bore provided with an exhaust opening, the stem of the piston being provided with means for closing said opening in one relative position of the parts, the said cylinder having an exhaust in the path of movement of the valve and the said exhaust in the valve being located to be brought into and out of communication with the last-mentioned exhaust from the cylinder through movement of the valve, means for admitting fluid under pressure to the cylinder at the other side of the piston, and means upon the stem of the piston coacting with the valve to carry the valve with the piston in one direction of movement of the piston.

73. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected to the shovel, the cylinder having an exhaust at one side of the piston, a valve slidably fitting the stem of the piston and having a bore provided with an exhaust opening, the said stem of the piston being provided with means for closing said opening in one relative position of the parts, the said cylinder having an exhaust in the path of movement of the valve and the said exhaust in the valve being located to be brought into and out of communication with the last-mentioned exhaust from the cylinder through movement of the valve, means for admitting fluid under pressure to the cylinder at the other side of the piston, the fluid pressure inlet to the cylinder having a branch normally closed by the valve and arranged to be uncovered by the valve in one phase of the operation of the valve.

74. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust at one side of the piston, a valve slidably fitting the stem of the piston and having a bore provided with an exhaust opening, the said stem of the piston being provided with means for closing said opening in one relative position of the parts, the said cylinder having an exhaust in the path of movement of the valve, and the said exhaust in the valve being located to be brought into and out of communication with the last-mentioned exhaust from the cylinder through movement of the valve, and means for admitting fluid under pressure to the cylinder at the other side of the piston, the valve having a head located within the cylinder, the inlet to the cylinder being positioned to provide for action of the fluid under pressure against the said head.

75. In a shoveling machine, a shovel supported for oscillation, means for imparting to the shovel successive impulsive scooping movements to cause the same to jig into and accumulate a load of the material to be handled the said means comprising a cylinder, a piston working in the cylinder and operatively connected with the shovel, the cylinder having an exhaust at one side of the piston, a valve slidably fitting the stem of the piston and having a bore provided with an exhaust opening, the said stem of the piston being provided with means for closing said opening in one relative position of the parts, the said cylinder having an exhaust in the path of movement of the valve, and the said exhaust in the valve being located to be brought into and out of communication with the last-mentioned exhaust from the cylinder through movement of the valve, and means for admitting fluid under pressure to the cylinder at the other side of the piston, the cylinder being provided in one end interiorly with a recess in communication with the fluid pressure inlet, and the said valve having a head to seat within the recess in one extreme position of movement of the valve.

76. In a shoveling machine, a shovel supported for oscillation, means for imparting to the shovel successive impulsive scooping movements to cause the same to jig into and accumulate a load of the material to be handled, the said means comprising a cylinder, a piston working in the cylinder and operatively connected with the shovel, the cylinder having an exhaust at one side of the piston and the said piston being provided with a stem having an abutment element and a valve head spaced inwardly from the abutment element, the cylinder having a bore in one end and being provided at its said end with an exhaust in communication with the bore and being also provided in its said end with a fluid pressure inlet having a branch communicating with the bore and a branch communicating with the interior of the cylinder, a floating sleeve valve slidably fitting in the bore and having an exhaust opening in its wall for communication with the last-mentioned exhaust in one phase of operation of the valve, the piston having a portion to seat against the inner end of the valve and of a diameter greater than that of the corresponding end of the bore of the valve, the said portion of the piston having a vent communicating with the bore and with the interior of the cylinder, the valve head upon the piston stem being arranged to control the exhaust in the valve, abutment elements upon the stem valve being arranged to coact with the outer end of the valve in one phase of operation of the motor, the body of the valve being arranged to control the inlet branch which communicates with the bore of the cylinder, and a head upon the inner end of the valve opposing the discharge end of the other branch of the inlet.

77. In a shoveling machine, a shovel and chute assemblage in which the shovel is suspended for oscillatory movement and for movement to discharging position with relation to the chute, means for imparting to the shovel successive impulsive scooping movements about its center of oscillation to cause the shovel to jig into and accumulate a load of the material to be handled, the said means comprising a fluid pressure motor including a cylinder, a piston working in the cylinder and operatively connected with the shovel, the cylinder having an inlet for fluid pressure to provide for operation of the piston in a direction to forwardly oscillate the shovel, the movement of the piston in the opposite direction under the influence of the resistance offered by the material to the shovel being effected through compression of air trapped in the cylinder at the other side of the piston, the cylinder having means whereby it will be automatically vented upon rebound of the piston under the influence of the trapped and compressed air, means for automatically controlling the admission of fluid under pressure to the first-mentioned end of the cylinder and operating in consonance with the movement of the piston, a second piston working in the cylinder and operatively connected with the shovel whereby upon movement in one direction, in a predetermined stationary position of the first-mentioned piston, the shovel will be moved to discharging position with relation to the chute, the cylinder having a fluid pressure inlet for admitting fluid under pressure behind the second-mentioned piston, and means for controlling the supply of fluid under pressure to the first and last-mentioned inlets of the cylinder comprising a valve including a casing, a valve movable in the casing and having an inlet passage for the fluid under pressure and an exhaust passage, the said casing having ports one in communication with the first-mentioned inlet to the cylinder and another in communication with the second-mentioned inlet to the cylinder, the valve being rotatable to position to bring its inlet passages selectively into communication with the said ports of the casing, and the said valve having exhaust passages communicating with the first-mentioned exhaust passage of the valve and positioned to be simultaneously brought into communication with the ports of the valve casing in one position of rotation of the valve within the casing.

78. In a shoveling machine, a shovel and chute assemblage in which the shovel is suspended for oscillatory movement and for movement to discharging position with relation to the chute, means for imparting to the shovel successive impulsive scooping movements about its center of oscillation to cause the shovel to jig into and accumulate a load of the material to be handled, the said means comprising a fluid pressure motor including a cylinder, a piston working in the cylinder and operatively connected with the shovel, the cylinder having an inlet for fluid pressure to provide for operation of the piston in a direction to forwardly oscillate the shovel, the movement of the piston in the opposite direction under the influence of the resistance offered by the material to the shovel being effected through compression of air trapped in the cylinder at the other side of the piston, the cylinder having means whereby it will be automatically vented upon rebound of the piston under the influence of the trapped and compressed air, means for automatically controlling the admission of fluid under pressure to the first-mentioned end of the cylinder and operating in consonance with the movement of the piston, a second piston working in the cylinder and operatively connected with the shovel whereby upon movement in one direction, in a predetermined stationary position of the first-mentioned piston, the shovel will be moved to discharging position with relation to the chute, the cylinder having a fluid pressure inlet for admitting fluid under pressure behind the second-mentioned piston, and means for controlling the admission of fluid under pressure to the first and last-mentioned inlets for the cylinder, the said means comprising a throttle valve including a casing, a valve proper comprising relatively rotatable members arranged within the casing, means for moving one of said members, and means for connecting the other member for movement with the first-mentioned member in a predetermined position of movement of the said first-mentioned member, the said casing having an exhaust port and fluid supply outlet ports one in communication with the first-mentioned inlet to the cylinder and another in communication with the last-mentioned inlet to the cylinder, the said second-mentioned member having an exhaust passage for communication with the exhaust port of the valve casing and having passages communicating with the exhaust passage and positioned to communicate with the fluid supply outlet ports when the exhaust passage of the said second mentioned valve member is in communication with the exhaust port of the casing, the said second mentioned member of the valve having a passage for communication selectively with the fluid supply outlet ports of the casing when the exhaust passage of the said second mentioned member of the valve is out of communication with the exhaust port of the casing, and the first-mentioned member of the valve having an intake passage for conducting the fluid under pressure, said passage being positioned to communicate with the last-mentioned passage of the second-mentioned member of the valve in the said predetermined position of movement of the said first-mentioned member of the valve.

79. In a shoveling machine, a shovel and chute assemblage in which the shovel is suspended for oscillatory movement and for movement to discharging position with relation to the chute, means for imparting to the shovel successive impulsive scooping movements about its center of oscillation to cause the shovel to jig into and accumulate a load of the material to be handled, the said means comprising a fluid pressure motor including a cylinder, a piston working in the cylinder and operatively connected with the shovel, the cylinder having an inlet for fluid pressure to provide for operation of the piston in a direction to forwardly oscillate the shovel, the movement of the piston in the opposite direction under the influence of the resistance offered by the material to the shovel being effected through compression of air trapped in the cylinder at the other side of the piston, the cylinder having means whereby it will be automatically vented upon rebound of the piston under the influence of the trapped and compressed air, means for automatically controlling the admission of fluid under pressure to the first-mentioned end of the cylinder and operating in consonance with the movement of the piston, a second piston working in the cylinder and operatively connected with the shovel whereby upon movement in one direction, in a predetermined stationary position of the first-mentioned piston, the shovel will be moved to discharging position with relation to the chute, the cylinder having a fluid pressure inlet for admitting fluid under pressure behind the second-mentioned piston, means for supporting and bodily elevating and tilting the shovel and chute assemblage comprising a cylinder, a piston working in the cylinder, a cylinder having a fluid pressure inlet below the piston, the said piston having operative connection with the shovel and chute assemblage, and means for selectively controlling the admission of fluid under pressure to the cylinder of the motor through the first and second-mentioned inlets thereof and to the inlet for the cylinder of the elevating means for the shovel and chute assemblage comprising a valve including a casing, the valve proper comprising relatively movable members, means for moving one of said members, means for connecting the other member for movement with the first-mentioned member in a pre-determined position of movement of the said first-mentioned member with relation to the second-mentioned member, the said casing having an exhaust port and fluid supply outlet ports one in communication with the first-mentioned inlet to the cylinder of the motor, another in communication with the second-mentioned inlet to the cylinder of the motor, and a third in communication with the inlet to the cylinder of the elevating means for the shovel and chute assemblage, the second-mentioned valve member having an exhaust passage for communication with the exhaust port of the casing and having passages all in communication with the exhaust passage and positioned to be simultaneously placed in communication with the fluid supply outlet ports of the casing when the exhaust passage of the said second mentioned member of the valve is in communication with the exhaust port of the casing, the said second mentioned member of the valve having a passage for selective communication with the fluid supply outlet ports of the casing in successive positions of the second mentioned valve member, the first-mentioned member of the valve having an intake passage for conducting the fluid under pressure which passage is positioned to communicate with the last-mentioned passage of the second-mentioned member of the valve in the said predetermined position of movement of the said first-mentioned member of the valve.

80. In a shoveling machine, a shovel suspended for oscillatory movement, and means connected with the shovel and operable to impart thereto successive impulsive movements about its center of suspension while in engagement with the work to cause the shovel to jig into and accumulate a load of the material to be handled.

81. In a shoveling machine, a shovel supported for free oscillation whereby its working nose may move in the arc of a circle, and means coacting with the shovel and operable to relatively rapidly oscillate the same while its nose is in contact with the material to be handled and while the point of suspension of the shovel remains relatively stationary, whereby the shovel will be caused to jig into and accumulate a load of the material.

82. In a shoveling machine, a shovel supported for free oscillation whereby its working nose may move in the arc of a circle, means coacting with the shovel and operable to relatively rapidly oscillate the same while its nose is in contact with the material to be handled and while the point of suspension of the shovel remains relatively stationary, whereby the shovel will be caused to jig into and accumulate a load of the material, and means for moving the shovel to position to discharge the accumulated load.

83. In a shoveling machine, an assemblage comprising a shovel and means to receive a load accumulated by and discharged from the shovel, the shovel being suspended for free oscillation, means connected with the shovel and operable to rapidly oscillate the same with an impulsive scooping movement while its point of suspension remains relatively stationary and while the nose of the shovel is in engagement with the material to be handled, whereby to cause the shovel to jig into and accumulate a load of the material, and means for operating the assemblage to discharge the accumulated load from the shovel to the receiving means.

84. In a shoveling machine, an assemblage comprising a shovel and means to receive a load accumulated by and discharged from the shovel, the shovel being suspended for free oscillation, means connected with the shovel and operable to rapidly oscillate the same with an impulsive scooping movement while its point of suspension remains relatively stationary and while the nose of the shovel is in engagement with the material to be handled, whereby to cause the shovel to jig into and accumulate a load of the material, means for operating the assemblage to discharge the accumulated load from the shovel to the receiving means, and controlling means common to the shovel operating and assemblage operating means.

85. In a shoveling machine, a shovel and chute assemblage, the shovel being suspended at the receiving end of the chute for oscillation, means connected with the shovel and operable to relatively rapidly oscillate the same with a scooping movement while in engagement with the material to be handled and thereby cause the shovel to jig into and accumulate a load of the material, and means for elevating and tilting the assemblage to discharge the accumulated load from the shovel through the chute.

86. In a shoveling machine, a shovel and chute assemblage, the shovel being suspended at the receiving end of the chute for oscillation, means connected with the shovel and operable to relatively rapidly oscillate the same with a scooping movement while in engagement with the material to be handled and thereby cause the shovel to jig into and accumulate a load of the material, means for elevating and tilting the assemblage to discharge the accumulated load from the shovel through the chute, and controlling means common to the shovel and assemblage operating means.

87. In a shoveling machine, a shovel suspended for oscillation, and fluid pressure means coacting with the shovel and operable to rapidly oscillate the same while in engagement with the material to be handled and constituting also means for cushioning the impact of the shovel with the material.

88. In a shoveling machine, a shovel suspended for oscillation, a high speed fluid pressure motor having a power transmitting element, and thrust connection between the said element and the shovel whereby operation of the motor will effect rapid oscillation of the shovel to cause the same to jig into and accumulate a load of the material to be handled.

89. In a shoveling machine, a supporting structure, an assemblage comprising a shovel and means for receiving a load discharged from the shovel, the said assemblage being mounted upon the supporting structure and the shovel being suspended for oscillation, the center of oscillation of the shovel being relatively close to the center of gravity of the machine as a whole, and means for relatively rapidly oscillating the shovel to accumulate a load of the material to be handled.

90. In a shoveling machine, a truck supported for travel, means for imparting travel to the truck, a turn table upon the truck, a hoist mounted upon the turn table, a shovel and chute assemblage carried by the hoist, and means operable to impart rapid oscillatory movement to the shovel.

91. In a shoveling machine, a truck supported for travel, fluid pressure means for imparting travel to the truck, a turn table upon the truck, fluid pressure means for actuating the turn table, a fluid pressure hoist mounted upon the turn table, a shovel and chute assemblage carried by the hoist, and fluid pressure means cooperating with the shovel to impart rapid oscillatory motion thereto.

92. In a shoveling machine, in combination, a support, a shovel suspended for oscillatory movement upon the support, means connected with the shovel and operable to impart thereto successive impulsive movements about its center of suspension while in engagement with the work to cause the shovel to jig into and accumulate a load of the material to be handled, and means for moving the support in the direction of the work.

In testimony whereof I affix my signature.
AUGUST G. LIEBMANN. [L. S.]

Certificate of Correction.

It is hereby certified that in Letters Patent No. 1,480,623, granted January 15, 1924, upon the application of August G. Liebmann, of Chicago, Illinois, for an improvement in "Automatic Fluid-Pressure-Operated Machine Shovels," an error appears in the printed specification requiring correction as follows: Page 20, line 74, claim 9, after the word "high" insert the word *speed;* and that the said Letters Patent should be read with this correction therein that the same may conform to the record of the case in the Patent Office.

Signed and sealed this 1st day of April, A. D. 1924.

[SEAL.]
KARL FENNING,
*Acting Commissioner of Patents.*